(12) United States Patent
Yamazaki et al.

(10) Patent No.: US 7,388,688 B2
(45) Date of Patent: Jun. 17, 2008

(54) PRINTING DEVICE, PRINTING METHOD, AND PRINTING CONTROL PROGRAM PRODUCT

(75) Inventors: Satoshi Yamazaki, Nagano (JP); Yoshifumi Arai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 748 days.

(21) Appl. No.: 10/859,662

(22) Filed: Jun. 2, 2004

(65) Prior Publication Data

US 2005/0052667 A1 Mar. 10, 2005

(30) Foreign Application Priority Data

Jun. 6, 2003 (JP) ............................. 2003-162671
Apr. 13, 2004 (JP) ............................. 2004-118190

(51) Int. Cl.
H04N 1/40 (2006.01)
(52) U.S. Cl. ...................................... 358/1.9; 358/504
(58) Field of Classification Search ................. 358/1.9, 358/2.1, 500, 502, 504, 518, 529; 347/19, 347/86–87, 100, 115
See application file for complete search history.

(56) References Cited

U.S. PATENT DOCUMENTS 5,949,447 A * 9/1999 Arai et al. .................... 347/23
6,467,869 B1 * 10/2002 Merz et al. ................... 347/19
7,029,105 B2 * 4/2006 Matsuba et al. .............. 347/86
7,093,932 B2 * 8/2006 Inokuchi et al. ............ 347/104

FOREIGN PATENT DOCUMENTS

JP 2002-225317 8/2002

OTHER PUBLICATIONS

Abstract of Japanese Patent Publication No. 2002-225317, Pub. Date: Aug. 14, 2002, Patent Abstracts of Japan.

* cited by examiner

Primary Examiner—Edward L. Coles
Assistant Examiner—Stephen Brinich
(74) Attorney, Agent, or Firm—Martine Penilla & Gencarella, LLP

(57) ABSTRACT

The invention employs at least three chromatic colored inks as well as a chromatic colored ink that has a lower spectral reflectance at each wavelength region in which the spectral reflectance of these three colored inks is greater. The chromatic colored ink is added to the at least three colors to enable printing with minimal differences between colors seen under a certain standard light source and the same colors seen under another light source. It is thus possible to ensure printing with fewer changes in color as a result of changes in light source, such as the ability to produce colors having a generally constant spectral reflectance across all wavelengths by combining inks.

8 Claims, 17 Drawing Sheets

FIG.4

| sR | G | B | C | M | Y | K | R | V |
|---|---|---|---|---|---|---|---|---|
| 255 | 255 | 255 | 0 | 0 | 0 | 0 | 0 | 0 |
| 128 | 128 | 128 | 152 | 0 | 72 | 0 | 160 | 0 |
| 0 | 0 | 0 | 3 | 0 | 0 | 252 | 0 | 3 |

PRINTING DEVICE, PRINTING METHOD, AND PRINTING CONTROL PROGRAM PRODUCT

BACKGROUND OF THE INVENTION

1. Field of the Invention

The present invention relates to a printing device, printing method, and printing control program product.

2. Description of the Related Art

The way humans see colors when colors are represented by ink on printing paper can be expressed as the product of the color-matching function (including the characteristics of the human eye), the reflectance of the ink and printing paper, and the spectral distribution of the light source. Printing devices normally represent colors through a combination of C (cyan), M (magenta), and Y (yellow) or similarly colored inks such as lc (light cyan) and lm (light magenta), and colors can therefore be said to look different as a result of changes in the spectral distribution of the ink in the product of the elements which govern the way colors appear, as described above. The CMY colors are combined as needed and printed onto printing paper to represent achromatic grays or any other color.

In such printing devices, colors are printed with reference to a predetermined relationship between combinations of ink and image data based on colors measured under a certain light source. Although colors must be measured under a certain light source since they are represented as the aforementioned product, when the printed results are seen under a different light source than the light source under which the colors were measured, the colors end up looking different. This phenomenon is particularly pronounced with low chromatic or achromatic grays. For example, colors that look gray in sunlight can appear to be imbued with color under indoor lamp light. Techniques have thus been proposed to minimize such changes in color as a result of changes in the light source (such as Japanese Unexamined Patent Application (Kokai) 2002-225317). Changes in the way colors appear are more pronounced with pigment-based inks.

SUMMARY OF THE INVENTION

The aforementioned conventional technology is capable of reducing changes in achromatic colors in which such light source-induced charges are most pronounced, but chromatic colors which look a certain color in sunlight can still look different indoors. In the sense of improving the overall performance of printers, it would still be desirable to be able to address such problems in chromatic colors as well as achromatic colors by supplementing the ink in printing devices. It would also be desirable to be able to supplement ink for better gray scale representation than when ink is not supplemented.

To address the above drawbacks, an object of the invention is to provide a printing device, printing method, and printing control program product that are capable of better gray scale representation and that are capable of printing results with fewer changes in both chromatic and achromatic colors due to changes in light source.

To achieve the above objects, the present invention is a printing device comprising an ink cartridge installation component in which a plurality of ink cartridges can be installed, and a printing mechanism for receiving ink from the ink cartridges and printing the ink on printing paper, wherein the ink cartridge installation component permits the installation of an ink cartridge for at least three colors, filled with chromatic colored ink, and the installation of a second ink cartridge filled with chromatic colored ink that has a lower spectral reflectance when printed at a certain area coverage on a certain printing medium at each wavelength region in which the spectral reflectance of the three colored inks is greater when they are printed at a certain area coverage on the certain printing medium.

That is, as noted above, the way in which colors are seen involves color-matching functions (including the characteristics of the human eye), the reflectance of the ink and printing paper, and the spectral distribution of the light source. The color-matching functions, which concern characteristics of the human eye, are assumed to be fixed. What changes when the light source changes would naturally be the spectral distribution of the light source. A structure by which the spectral reflectance is adjusted through the adjustment of ink properties would therefore be desirable in order to artificially control the way colors look under different light sources. The reflectance can be controlled with greater flexibility by combining the ink in the second ink cartridge with the at least three chromatic colors of inks, thus minimizing differences in the way colors look under different light sources. The fact that the ink in the second ink cartridge is a chromatic color makes it possible to represent other colors in addition to those which can be represented by combining the at least three colors of ink, and allows a richer gray scale to be represented, resulting in better overall printer performance.

The spectral reflectance is unique for each type and color of ink. The level of the reflectance at each wavelength of light, that is, the spectral reflectance, contributes to the way colors look. For example, visible light with a wavelength of about 630 nm looks red to the human eye. Ink with a high spectral reflectance of about 630 nm and a low spectral reflectance at other wavelengths thus tends to look red. Although the three colors of chromatic colored ink have varying spectral reflectance levels to visible light, flexible control of the spectral reflectance can be achieved with the use of an ink which has a lower spectral reflectance, in comparison to any of the three colored inks, at wavelength regions in which the spectral reflectance of the above colors is greater.

It is necessary and sufficient to use at least three colors of ink to represent any color in printing devices and the like. When the three colors of ink are combined, the spectral reflectance values of the combined colors overlap. Macroscopically, the colors will look like colors at wavelengths with higher spectral reflectance values, but colors closer to the ideal can be achieved with more flexible control of the overlapping spectral reflectance values through the overlap of ink that has a lower spectral reflectance at wavelength regions where the three colors of ink result in a greater spectral reflectance. For example, although the overlapping spectral reflectance of achromatic colors would ideally remain constant across all wavelengths of visible light, it is difficult to produce a constant overlapping spectral reflectance through combinations of the at least three colors of ink, and the spectral reflectance is uneven. Projections in the spectral reflectance tend to occur in wavelength regions where the spectral reflectance is greater for all of the at least three colors of ink, and the overlapping spectral reflectance levels can therefore be made more constant by combining an ink having a lower spectral reflectance in those wavelength regions. Of course, since the ink in the second ink cartridge is a chromatic color, it is possible to control changes in the way colors look as a result of changes in light source, even when the color is chromatic.

There are at least three colors of chromatic colored ink in the above ink cartridge, the combination of which will allow generally any color to be represented under a specific light source. Examples include CMY inks or R (red), G (green), and B (blue) ink combinations. There should be at least three colors of ink, of course, and printers may also include inks of similar hues in addition to these.

That is, lc, lm, and DY (dark yellow) may also be used in addition to the CMY inks above. These lc, lm, and DY inks have generally the same hues as CMY inks, and the wavelength regions where they have greater spectral reflectance levels are generally the same as those of CMY. Because the chromatic colored ink in the second ink cartridge will have a lower spectral reflectance in the wavelength regions where the lc, lm, and DY have a greater spectral reflectance, the effects of the invention will still be obtained. The invention is applicable to ink jet type printers which eject drops of ink, laser printers featuring the use of toner ink, or various other embodiments of printing devices.

In one example of a structure for evaluating the magnitude of the spectral reflectance of the ink in the second ink cartridge and the spectral reflectance of the at least three colors of ink, wavelength regions resulting in a greater spectral reflectance when the inks are printed at a certain area coverage on a certain printing medium are wavelength regions where the spectral reflectance is greater than a first certain threshold, and the lower spectral reflectance is a value where the spectral reflectance is lower than a second certain threshold. That is, the magnitude of the spectral reflectance can be evaluated on the basis of threshold values.

Because an object of the present invention is to minimize changes in color as a result of changes in light source, in a preferred embodiment the overlapping spectral reflectance resulting from the combinations of ink should be modified in a flexible manner, the at least three colors of ink should have a greater light reflection component, and the ink in the second ink cartridge should have a greater light absorption component. In that sense, the first threshold should be a spectral reflectance of at least 50%, and preferably at least 60%, and the second threshold should be a spectral reflectance of no more than a 50%, and preferably no more than a 20%. In this way, the ink of the second ink cartridge can be added so that the spectral reflectance is greater outside of wavelength regions where the overlapping spectral reflectance of the at least three colors combined is greater, allowing the spectral reflectance to be controlled in a flexible manner.

In another structure that can be used, the wavelength region resulting in a greater spectral reflectance when the inks are printed at a certain area coverage on a certain printing medium will overlap with at least a portion of the wavelength region where the ink of the second ink cartridge has a lower spectral reflectance. That is, when the wavelength region where the spectral reflectance is greater and the region where it is lower are not completely consistent with each other, the ink from the second ink cartridge can be added so that the spectral reflectance is greater other than in the wavelength region where the overlapping spectral reflectance resulting from the combination of the at least three colors is greater, allowing the spectral reflectance to be controlled in a flexible manner.

Another structure that can be used is a printing device comprising an ink cartridge installation component in which a plurality of ink cartridges can be installed, and a printing mechanism for receiving ink from the ink cartridges and printing the ink on printing paper, wherein the ink cartridge installation component permits the installation of an ink cartridge for at least three colors, filled with chromatic colored ink, and the installation of a second ink cartridge filled with chromatic colored ink that has a lower spectral reflectance when printed at a certain area coverage on a certain printing medium at a wavelength different from the wavelength regions in which the spectral reflectance of the three colored inks is lower when they are printed at a certain area coverage on the certain printing medium That is, there are wavelength regions where the spectral reflectance is greater or lower in order to develop the chromatic colors of the inks, but for flexible adjustment of the overlapping spectral reflectance resulting from the combination of the three chromatic colored inks, ink should be added so that the spectral reflectance can be increased in the wavelength region where the combination of the at least three colors of ink results in a lower spectral reflectance, and the spectral reflectance should not be increased in other wavelength regions. Flexible adjustment of the overlapping spectral reflectance can be achieved by adding a chromatic colored ink that has a low spectral reflectance when printed at a certain area coverage onto a certain printing medium at wavelength regions different from the wavelength regions where the three colors o fink have a low spectral reflectance when printed at a certain area coverage onto a certain printing medium. In this case as well, a certain threshold, preferably no more than 20%, can be used as an indicator for determining whether or not the spectral reflectance is low.

Another structure that can be used is a printing device comprising an ink cartridge installation component in which a plurality of ink cartridges can be installed, and a printing mechanism for receiving ink from the ink cartridges and printing the ink on printing paper, wherein the ink cartridge installation component permits the installation of an ink cartridge for at least three colors, filled with chromatic colored ink, and the installation of a second ink cartridge filled with ink of a different color than the above three inks; and the ink in the second ink cartridge is added to the above at least three inks in order to print with minimal differences between colors seen under a certain standard light source and the same colors seen under another light source.

That is, nearly any color can be represented by three commonly used colors of ink, but the number of ink combinations for representing the same colors can be increased with the addition of an ink of a different color than the three colors. For example, when certain colors represented by a combination of three colors of ink are represented by a combination of four or more colors of ink, the combination of four colors is not absolutely determined, and the same colors can be represented by a plurality of combinations. It is thus possible to select a preferred combination that will minimize differences in color before and after changes in light source. Printing with this combination of inks can control changes in color when viewing printed materials, whether of chromatic or achromatic colors, under a different light source.

An ink of a different color from the three colors of ink can be added in the present invention to increase the choice of color combinations when representing certain colors. Various types of inks can be used, such as inks of a color with different hues from the three colors of inks, inks that have a lower spectral reflectance at wavelength regions resulting in a greater spectral reflectance when the three colors of ink are printed at a certain area coverage onto a certain printing medium, and inks that have a lower spectral reflectance at a wavelength region different from the wavelength regions resulting in a lower spectral reflectance when the three colors of ink are printed at a certain area coverage onto a certain printing medium.

Various structures can be used to minimize differences in the way colors look under a certain standard light source and the way the same colors look under a different light source. Several patches can be printed out by altering a little at a time the amounts of ink used for certain colors, and the colors can be measured or ascertained by computation under a standard light source and other light sources, so as to select combinations of ink colors with the least differences in color. Colors should be compared under at least two light sources, but differences can naturally be kept to a minimum by comparing colors under three or more light sources.

Any light source can be used as the standard light source or other light source, although sunlight (such as D50, D65, or the like in the CIE Standards) is preferred, in the sense that the way colors look can be the most standardized. The undesirability of making colors looking different should be taken in to consideration when contemplating other light sources. General purpose light sources should be used for indoor light when changes in color are to be avoided indoors, for example.

In another structure that can be used, the above printing devices specify the amount of ink used for printing during the formation of images by referencing a color conversion table that represents a plurality of colors by means of a color system used with image data showing images for printing and a color system with ink color image data in which the color components are the colored inks, and that relates the colors of the two systems to each other, where the colors shown by the ink color image data determined by the color conversion table are colors with minimal differences between the colors seen under a certain standard light source and the same colors seen under another light source.

That is, in common printing devices, color conversion is implemented with reference to a color conversion table because of differences between color systems used with image data showing images for printing and color systems used with ink color image data in which colors are represented using colored inks as the color components. The color conversion table relates the above color component values in the image data and the color component values in the ink color image data to each other. As such, ink color image data showing minimal color differences as noted above is registered in the color conversion table, allowing colors to be converted and printed with colors characterized by minimal changes in color.

A variety of structures can be used for printing without producing changes in the way colors look due to changes in light source as described above, but since such changes in color due to light source generally tend to be more conspicuous for generally achromatic colors, the effects of the invention are particularly apparent with generally achromatic colors. That is, when generally achromatic colors are produced, the spectral reflectance of the generally achromatic colors is the result of the overlap of spectral reflectance of the different colored inks. The overlapping spectral reflectance is ideally constant across all wavelengths of visible light. However, the overlapping spectral reflectance is not constant in combinations of three colors of chromatic colored ink; the spectral reflectance is higher at certain wavelengths, and is lower at other wavelengths. Of course, despite the unevenness of the spectral reflectance by wavelength, colors will look sufficiently achromatic depending on the light source, but if the light source is characterized by substantial spectral energy at wavelengths with greater spectral reflectance, then the colors will be imbued according to wavelength with such a greater spectral reflectance.

The ink in the second ink cartridge described above can be used to reduce the spectral reflectance waveform unevenness of generally achromatic colors produced by combinations of three colors, and can provide a more consistent spectral reflectance across all wavelengths. Of course, the chromatic colored inks in the ink cartridges described above are at least three colors, and it should be possible to represent generally achromatic colors with combinations of these inks. Various embodiments can be used, such as printing devices including the above CMY inks or RGB inks as well as shading inks.

In printing devices capable of using ink cartridges filled with at least three colors of chromatic colored ink, the second ink cartridge can be a default or optional ink cartridge. The printing device should also be able to receive ink from the ink cartridges in order to print. When a second ink cartridge is used, an ink channel or the like is formed capable of ejecting the ink in the second ink cartridge in addition to the at least three colors of chromatic ink.

In a specific preferred embodiment of ink for the second ink cartridge, when the ink of the second ink cartridge is printed at a certain area coverage onto a certain printing medium, the spectral reflectance is lower than when the three colors are printed at a certain area coverage on the certain printing medium at a wavelength region where the spectral reflectance is greater at a certain wavelength (when a combination of the three colors is printed at a certain area coverage on a certain printing medium) than the spectral reflectance at another wavelength.

That is, when the spectral reflectance is greater at a certain wavelength (when a combination of the three colors is printed at a certain area coverage on a certain printing medium) than the spectral reflectance at another wavelength, the spectral reflectance at that wavelength region is the cause of tinting due to changes in light source, but combining an ink having a lower spectral reflectance than that of any of the three colors at that wavelength region can increase the spectral reflectance at other wavelength regions while still controlling the spectral reflectance at that wavelength region. The spectral reflectance of such combinations can therefore be modified in a flexible manner. Particularly in the case of achromatic colors, it is possible to achieve a more constant spectral reflectance when combining inks, that is, it is possible to reduce spectral reflectance wavelength unevenness, and to produce achromatic colors which do not change as a result of changes in light source.

In the present invention, the spectral reflectance is a physical quantity obtained when ink is printed at a certain area coverage on a certain printing medium, and is the reflectance relative to the wavelength of the light. The certain printing medium should be one in which the spectral reflectance is generally constant in order to allow the spectral reflectance to be defined as a property of each ink, with minimal influence by the printing medium. The area coverage is defined as the ratio between the area occupied by the printed ink in a given region and the area of the given region. A value of 40% can be used, for example. The spectral reflectance properties should be ascertained. Although there is no need to establish any strict numerical values, it should therefore be determined such as by printing 40% with monochromatic ink or by printing 40% with a combination of a plurality of colored inks (such as CMY). Of course, the numerical value can be a value other than 40%, such as 25%. When a plurality of colors of ink are combined, the amounts of the individual colors may be the same or different.

Pigment-based inks are desirable inks for use in the aforementioned plurality of ink cartridges in the invention. That is, the colors of materials printed with pigment-based inks tend to look different as a result of the light source more than dye-based inks will. The invention can thus be employed for pigment-based inks to effectively prevent such changes in color where changes in light source are likely to result in such color changes.

In another structure that can be used as the ink in the above ink cartridge, an ink cartridge filled with cyan, magenta, and yellow inks as the at least three colored inks may be installed in the ink cartridge installation component, and a second ink cartridge filled with red and/or violet ink may be installed.

That is, cyan ink has a high spectral reflectance at wavelengths of about 450 to 500 nm, yellow ink has high spectral reflectance at wavelengths of about 500 to 750 nm, and magenta ink has a high spectral reflectance at wavelengths of about 600 to 700 nm and about 400 to 500 nm. The spectral reflectance of the three colors is therefore high around 500 nm. Red ink and violet (V) ink have an extremely low spectral reflectance at about 500 nm, and can absorb light at this wavelength.

As such, the combination of CMY inks tends to result in a high spectral reflectance around 500 nm, but the addition of R and V ink will increase the spectral reflectance on either side of that wavelength without increasing the spectral reflectance at 500 nm. It is thus possible to adjust the spectral reflectance of the combined inks so that there are no projections in the spectral reflectance at 500 nm, resulting in nearly ideal achromatic or chromatic colors.

The second ink cartridge may be filled with R or V ink, but since the R hue angle is between that of M and Y, while the hue angle of V is between M and C, the use of both R and V inks can represent generally the same colors for more combinations. Furthermore, since ink cartridges filled with CMY inks are frequently used in normal printing devices, this structure will be applicable to an extremely large number of printing devices.

In another structure that can be used, an ink cartridge for at least 6 colors of ink is installed in the ink cartridge installation component, and the second ink cartridge can be exchanged for any one or more ink cartridges. That is, the ink in the second ink cartridge in the invention can be used as a replacement ink in printing devices in which 6 or more colors of ink can be installed.

For example, in printing devices permitting the installation of CMYKlclm ink cartridges, any of the lc, lm, or K inks can be replaced by either R or V ink. Of course, this also applies to printing devices permitting the installation of CMYKlclmDY inks. This type of exchangeable structure allows printing to be accomplished using the R and V inks of the invention as needed while printing is normally accomplished with conventional CMYKlclm inks, etc.

In another structure that can be used, the printing device can further comprise: a component for obtaining image data comprising dot matrix pixels; a color conversion table memory component for storing color conversion tables determining the relationship between the above image data and ink color image data determining the color of the pixels based on the color of the ink in the second ink cartridge and the at least three chromatic colors; a color conversion component for converting the above image data to the above ink color image data by referencing the color conversion tables; a printing data generating component for generating printing data to permit printing with the colors determined by the ink color image data following color conversion; and a printing mechanism control component for controlling the printing mechanism based on the printing data.

That is, in structures which print image data comprising dot matrix pixels while converted to ink color image data comprising combinations of ink colors used in printing devices, the correlation between the image data obtained above and the ink color image data including the color of the ink in the second ink cartridge of the invention can be determined by the color conversion tables to enable easier color conversion with color conversion tables in the structures of the invention. Printing can also be done using the ink of the second ink cartridge in the invention by producing printing data allowing ink to be used in amounts suited to the stipulated details of the various color components in the ink color image data after color conversion.

In another structure that can be used, the color conversion tables are prepared by a color separation process in which the at least three chromatic colors are replaced by the color of the ink in the second ink cartridge. That is, the procedure through which colors represented by the combination of at least three chromatic colors, such as CMY, are determined in the color conversion tables is established in the conventional manner. Thus, when combinations of three chromatic colors are determined, any color among them can be replaced by the color of ink in the second ink cartridge to easily prepare a color equivalent to the original color using the color of the ink in the second ink cartridge.

When the at least three chromatic colors can be replaced with the ink in the second ink cartridge during the color separation process, the replaced color readily corresponds to combinations of RGB data in the image data, allowing color conversion tables to be readily prepared using the ink in the second ink cartridge of the invention. Of course, when minimizing color differences, several of the same colors should be printed using the color image data of several kinds of ink in the manner described above to select ink color image data for determining colors with minimal differences in color.

In another structure that can be used, the magenta and yellow inks can be replaced by the red ink in the color separation process. That is, because the hue angle of R is between that of M and Y, the color separation process can be readily carried out by exchanging R for M and Y in printing devices using CMY ink. Various replacement indicators can be used, such as implementing the maximum replaceable replacement. Of course, the color of the images printed with the ink after the color separation process can be measured to produce a more accurate color conversion table.

In another structure that can be used, the magenta and cyan inks can be replaced by the violet ink in the color separation process. That is, because the hue angle of V is between that of M and C, and the color separation process can be readily carried out by exchanging V for M and C in printing devices using CMY ink. Various replacement indicators can be used, such as implementing the maximum replaceable replacement. The color of the images printed with the ink after the color separation process can be measured to produce a more accurate color conversion table.

The concept of the invention includes various embodiments without being limited as to whether such printing devices are used on their own or in conjunction with certain machines. As such, the invention is constructed as a procedure for printing using ink in a second ink cartridge to prevent differences in color as a result of changes in light source. That is, the invention is not limited to any actual device, but is equal to its effects as a method.

The realization of the concept of the invention also includes software for printing devices. This is equally true of software recording media, which may be magnetic recording media, or magneto-optical recording media, or any recording media developed in the future. This is equally true of any stage of replication, such as primary or secondary products. It is also true of the concept of the invention when realized in part by software and in part by hardware, as well as embodiments in which portions are stored on recording media and are read as needed.

BRIEF DESCRIPTION OF THE DRAWINGS

FIG. 4 illustrates an example of an LUT.

DETAILED DESCRIPTION

Figure 1:
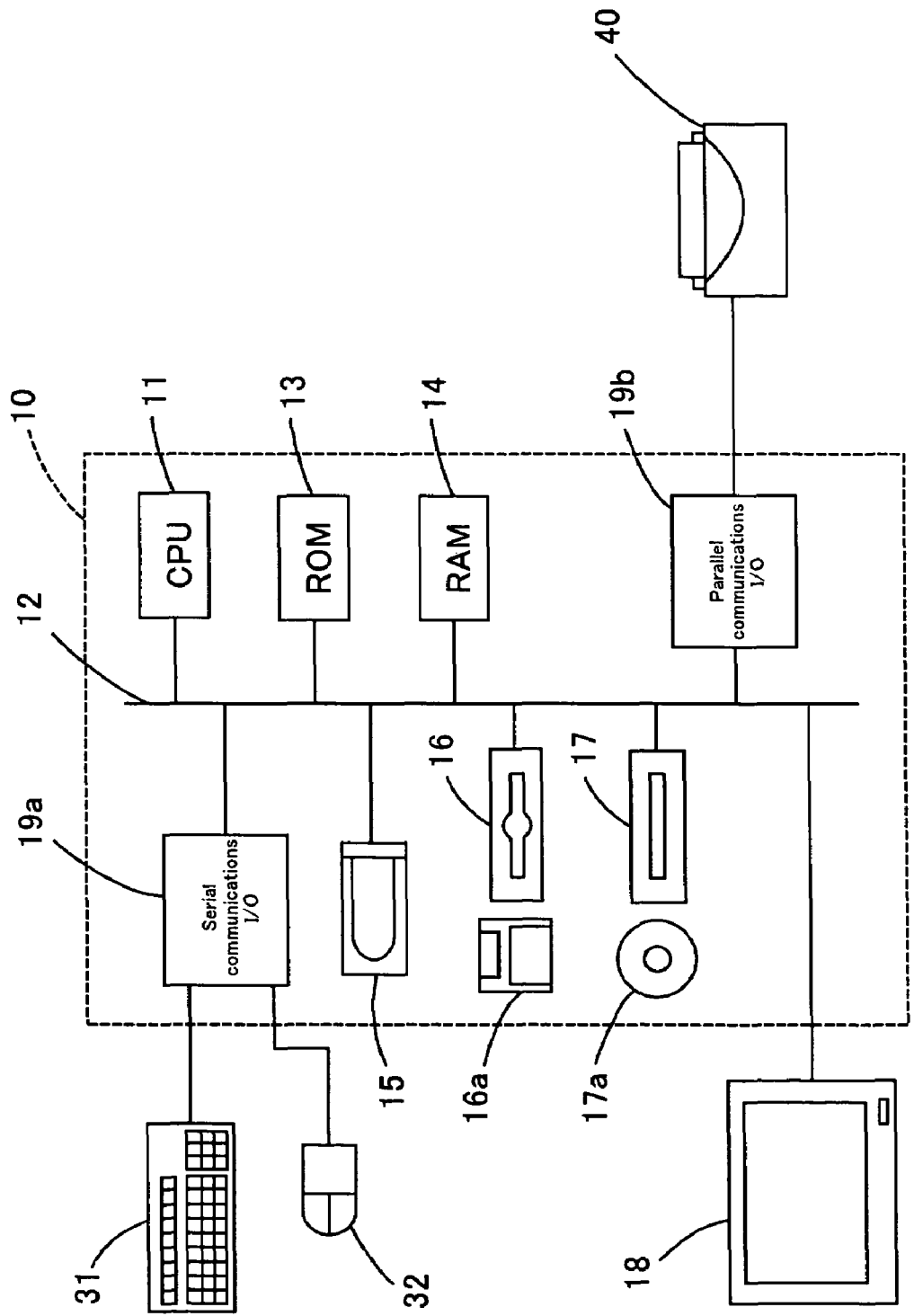
FIG. 1 schematically illustrates the hardware structure of a system constituting a printing device.
Figure 2:
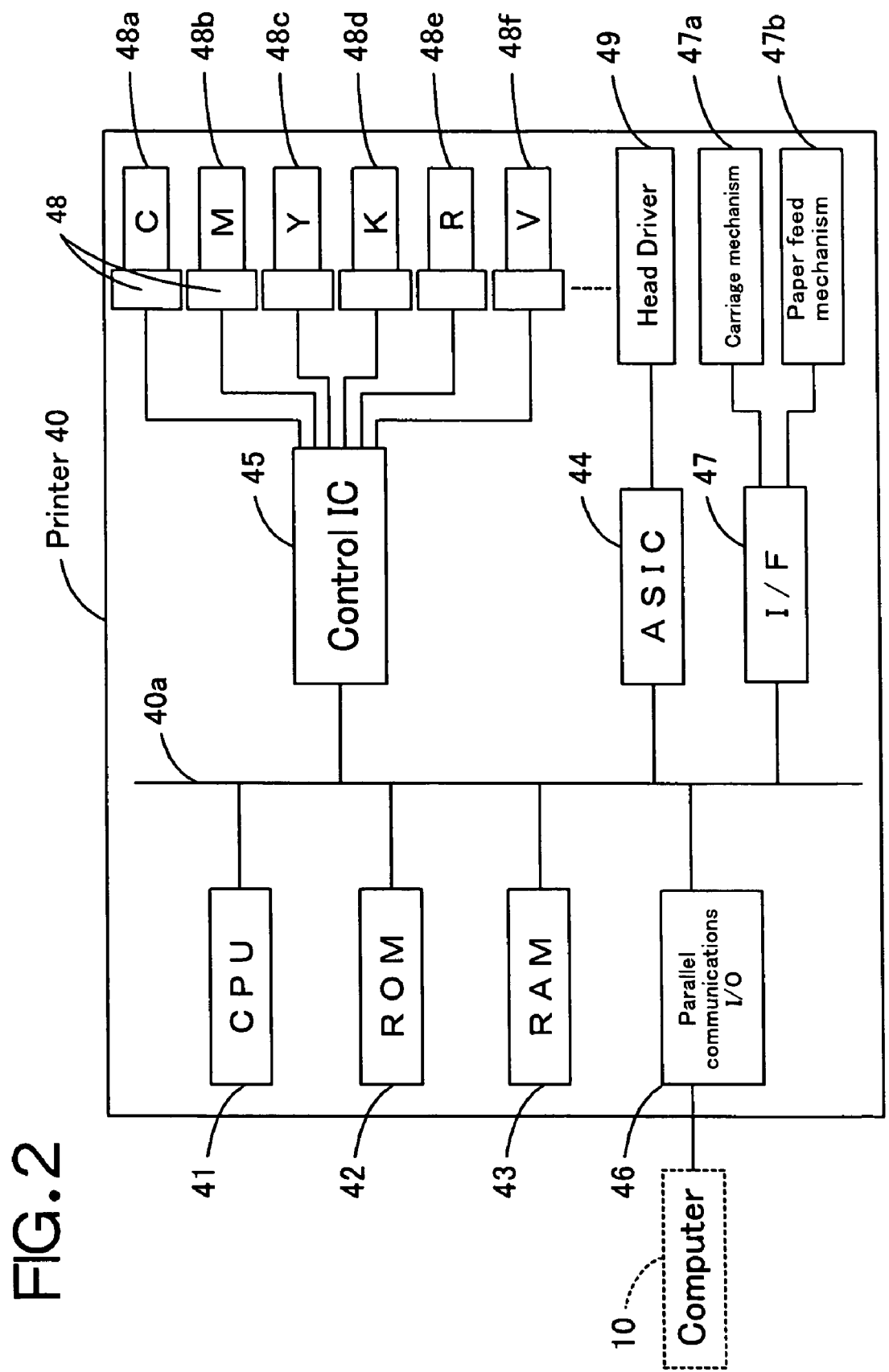
FIG. 2 schematically illustrates the hardware structure of a printer.
Figure 3:
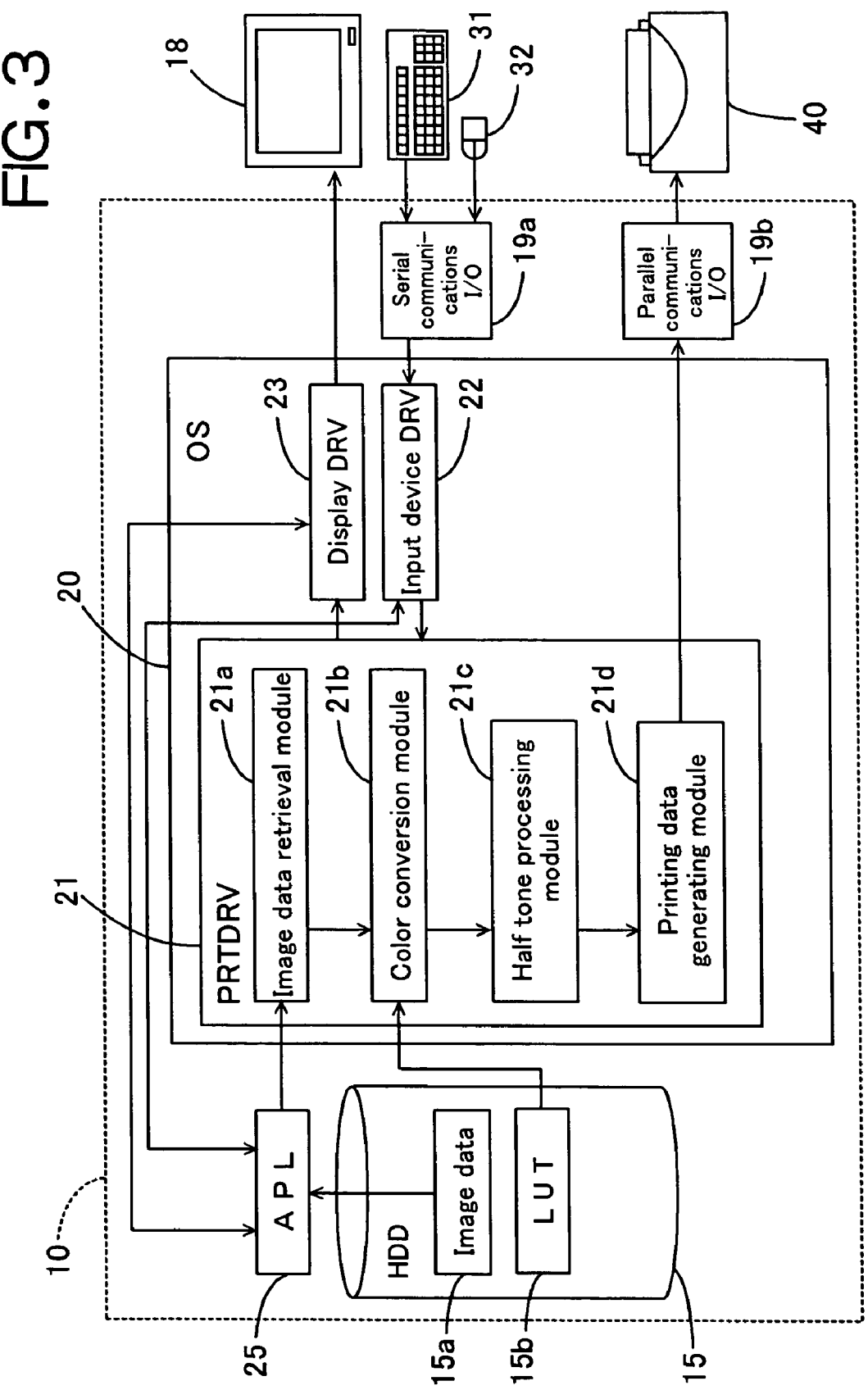
FIG. 3 is a schematic structural illustration of the main control system of a printing device.

1) Structure of Invention
2) Structure of LUT
3) Printing Process
4) Printing Images
5) Elimination of Light Source Dependency
6) Second Embodiment
7) Other Embodiments 1) Structure of Invention FIG. 1 schematically illustrates the hardware structure of a system constituting a printing device. FIG. 2 schematically illustrates the hardware structure of a printer. FIG. 3 is a schematic structural illustration of the main control system of a printing device run by a computer. That is, in this embodiment, a printing device is constructed of a printer and a computer for controlling the printer. The computer 10 comprises a CPU which acts as the center of the computing processes. The CPU 11 can be accessed by ROM 13 or RAM 14 stored in BIOS or the like through a system bus 12.

The system bus 12 is connected to external memory devices such as a hard disk drive (HDD) 15, floppy disk drive 16, and CD-ROM drive 17. The OS 20, application program (APL), or the like stored on the HDD 15 is transferred to RAM 14, and the CPU 11 accesses the ROM 13 and RAM 14 as needed to run the software. That is, various programs are run using RAM 14 as a temporary work area.

A keyboard 31, mouse 32, or other input device is connected via a serial communications I/O 19a to the computer 10. A display 18 is also connected via a video board (not shown). A printer 40 can furthermore be connected via a parallel communications I/O 19b. The structure of the computer 10 has been schematized, but those with a common personal computer structure can be used. Of course, computers for which the invention is applicable are not limited to personal computers. This embodiment is of the type that is referred to as a desktop computer, but notebook types and laptops may also be used. The connection interface between the computer 10 and printer 40 need not be limited to the one described above. Various connection configurations such as serial interfaces, SCSI, and USB connections can also be used.

In this example, various programs are stored on the HDD 15, but recording media are not limited to that. Floppy discs 16a and CD-ROM 17a may also be used, for example. The programs recorded on such media are read into the computer 10 via a floppy disc drive 16 or CD-ROM drive 17 and installed on the HDD 15. They are then read on RAM 14 via the HDD 15 to control the computer. The recording media are not limited to the above, and can also include magneto-optical recording media. Nonvolatile memory such as flash cards can also be used as semiconductor devices.

As illustrated in FIG. 2, the bus 40a inside the printer 40 is connected to the CPU 41, ROM 42, RAM 43, ASIC 44, controller IC 45, parallel communications I/O 46, and interface (I/F) 47 for transmitting image data or drive signals, etc. The CPU 41 controls the various components according to programs read into ROM 42 while using RAM 43 as a work area. ASIC 44 is a customized IC for driving a printing head (not shown), and performs the process for driving the printing head while transmitting and receiving certain signals to and from the CPU 41. Printing voltage data is also output for the head driver 49.

The head driver 49 is a circuit comprising a dedicated IC, driving transistors, and the like. The head driver 49 produces printing voltage patterns for the piezo elements stored in the printing head based on printing voltage data input from the ASIC 44. The printing head is connected by separate ink tubes to a cartridge holder 48 capable of holding ink cartridges 48a through 48f filled with 6 colors of pigment-based ink, and receives these inks. Ink is ejected by the activation of the piezo elements in ink chambers connected from the tubes to the ejection ports. General purpose CMYK ink and the RV inks of the invention are used in this embodiment. The effects of the invention are particularly apparent with pigment-based inks, but dye-based inks may also be used.

The RV inks have a different hue than CMY chromatic colors, and as described below are capable of reducing changes in the spectral reflectance of generally achromatic colors as a result of the combination of CMY. The RV are chromatic colored inks resulting in a lower spectral reflectance when printed at a certain area coverage on a certain printing medium at wavelength regions where the spectral reflectance of the CMY inks is greater. This corresponds to the ink in the second ink cartridge, which is a chromatic colored ink having a larger spectral reflectance when printed at a certain area coverage on a certain printing medium at a wavelength region different from the wavelength regions where the spectral reflectance of the CMY inks is lower. The cartridge holder 48 corresponds to the ink cartridge installation component, while the ASIC 44, head driver 49, carriage mechanism 47a, and paper feed mechanism 47b correspond to the printing mechanism.

Six sets of nozzle rows for ejecting the six colors of ink are formed on the ink ejecting surface of the printing head so that they are lined up in the main scanning direction of the printing head. The plurality of nozzles (such as 48) of the nozzle rows are disposed at certain intervals in the sub-scanning direction. The cartridge holder 48 comprises ink supplying needles, which are in contact with ink supplying ports (not shown) disposed in the ink cartridges 48a through 48f to form ink supplying channels, thereby supplying the ink inside the ink cartridge through the tubes to the printing head.

The control IC 45 is an IC provided to control the cartridge memory, which is nonvolatile memory provided in each ink cartridge 48a through 48f. When the ink cartridges are installed in the cartridge holder 48, the cartridge memory is electrically connected to the control IC 45. The CPU 41 transmits and receives certain signals to and from the control IC 45 to refresh data on the amount of ink remaining or to read data on the amount of 9ink remaining or the colors of ink stored in the cartridge memory.

The parallel communications I/O 46 is connected to the parallel communications I/O 19b of the computer 10, and the printer 40 receives print jobs comprising data transmitted from the computer 10 through the parallel communications I/O 46, such as data specifying the CMYKRV dot-forming density, or page description language, etc. Upon reception of various commands from the computer 10, the communications I/O outputs data indicating the set up status or ink color from the control IC 45.

The I/F 47 is connected to the carriage mechanism 47a and paper feed mechanism 47b. The paper feed mechanism 47b comprises a paper feed motor, paper feed roller, or the like, and sequentially feeds the printing medium such as printing paper in the sub-scanning direction. The carriage mechanism 47a comprises a carriage on which the printing head is installed, and a carriage motor for driving the carriage by means of a timing belt or the like in the main scanning direction. From the printing head, which has a plurality of nozzles in the sub-scanning direction, droplets of ink are ejected in units of dots from the nozzles when the piezo elements are driven by drive signals output by the head driver 49 based on head data comprising bit strings.

The printer 40 prints under the control of a printer driver installed on the computer 10. As illustrated in FIG. 3, in the computer 10 in this embodiment, a printer drive (PRTDRV) 21, input driver (DRV) 22, and display driver (DRV) 23 are incorporated in the OS 20. The display driver DRV 23 controls the display such as of image data on the display 18, and the input driver DRV 22 handles certain input operations upon receipt of code signals from a mouse 32 or keyboard 31 input via the serial communications I/O 19a.

The APL 25 is an application program capable of executing color image retouching or the like, allowing the user to operate the aforementioned input devices under the control of the APL 25 to print images on the printer 40. That is, upon the user's command, the APL 25 reads the image data 15a stored on the HDD 15 into RAM 14, and displays the image on the display 18 based on the image data 15a by means of the display driver DRV 23. When the user operates the input device, the details of the operation are obtained by means of the input driver DRV 22 and the details are interpreted. The APL 25 performs a variety of processes, such as retouching, or printing commands according to the operating details.

The PRT DRV 21 is driven by printing commands from the APL 25. The PRT DRV 21 sends data to the display driver DRV 23 for display on a UI (not shown) to input data needed for printing. The user can set various parameters such as the number of printings or the number of pages by means of the UI (not shown). The PRT DRV 21 receives these parameters through the input device driver DRV 22. When the PRT DRV 21 receives the parameters, it prepares printing data while the image data 15a specifying the colors in sRGB undergoes color conversion to CMYKRV color data with reference to the LUT 15b described below, and the printing data is sent to the printer 40 to be printed.

2) Structure of LUT

FIG. 4 illustrates an example of an LUT. In the LUT 15b, each of the elements in the RGB data and CMYKRV data has a value of 0 to 255, which is the 256 gray scale for each color (8 bits). Of course, each color may have a higher gray scale of 10 or 16 bits. Reference points regarding RGB data are created by assigning a gray scale range in intervals of 16 for each RGB color component. All combinations of gray scale values "0, 16, 32, . . . , 255" for each RGB color are standardized. There are thus $17^3$ reference points for the LUT 15b. Naturally, the gray scale may be unequally spaced, such as "0, 12, 26, . . . , 230, 255," for greater accuracy. $33^3$ or $9^3$ reference points can be set to increase accuracy or conserve resources. A variety of structures may be used.

In regard to reference points, the gray scale of each CMYKRV color is determined at a value of "0 to 255." During color conversion, any RGB data may be converted to CMYKRV data by interpolation with reference to the RGB data and CMYKRV data. Of course, for the LUT, a different table can be produced and selected as needed for each ink set or media usable by the printer 40. In this embodiment, the image data 15a is in the form of dot matrix data representing data according to the sRGB standard. Of course, in the LUT 15b, colors can be determined for sets of specific RGB data in a predetermined sequence in addition to structures having specific sRGB data values as the data, and the specific RGB data values may be reduced.

Figure 5:
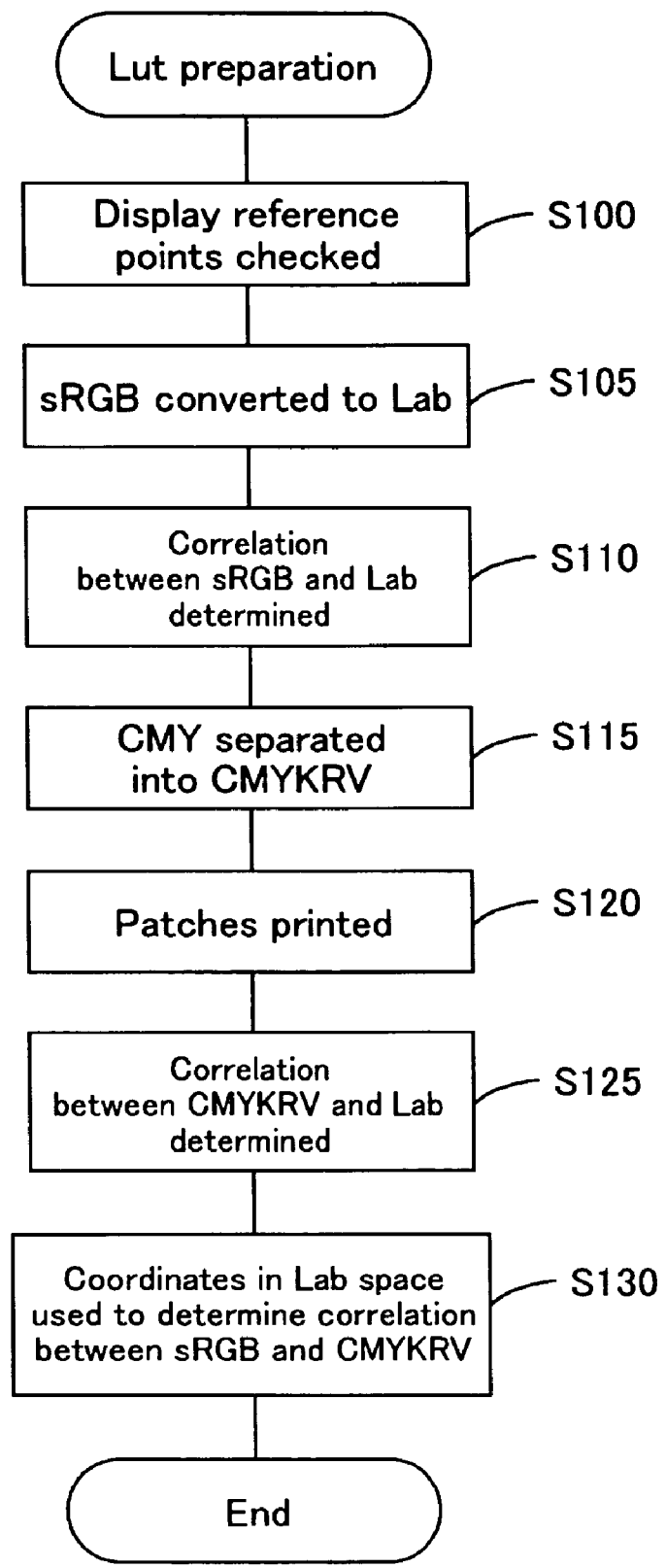
FIG. 5 is a flow chart of the operations for preparing an LUT.

A process according to the flow chart in FIG. 5 can be used to prepare the LUT 15b. A computer should be used as this will require considerable computation. In the LUT 15b, the sRGB data is determined so as to encompass all the space in the sRGB color space, the colors based on the sRGB data used by the display 18 and the CMYKRV data used by the printer 40 are converted to Lab space coordinates, and the sRGB data and CMYKRV data are matched in Lab space. Here, RGB is defined as data in accordance with sRGB standards, but other standards or color spaces such as Adobe RGB (Adobe is a registered trademark of Adobe Systems Inc) or Apple RGB (Apple is a registered trademark of Apple Computer Inc) can also be used. That is, there should be a correspondence between RGB and Lab values. At any rate, when preparing the LUT, reference points for the display 18 are first extracted in Step S100. The $17^3$ sRGB gray scale levels on the left in FIG. 4 are set by means of this extraction.

In Step S105, the set sRGB gray scale levels are converted to Lab space coordinates. As the image data based on sRGB standards can be converted to Lab space coordinates by a well known conversion formula, they may be converted to Lab coordinates based on a conversion formula in Step S105, colors based on the above reference points can be displayed on the display 18, and the Lab coordinates can be obtained with a color measuring device or the like. The Lab coordinates of the colors corresponding to the sRGB reference points are thus obtained, and the correlation between the Lab gray scale levels and the $17^3$ sRGB gray scale levels on the left in FIG. 4 is determined in Step S110.

Next, in Step S115, K is added to CMY, and the RV ink is furthermore added, so as to lower the values for any one, or combination, of CMY and determine the CMYKRV data. That is, the CMY data is separated into CMYKRV data. In this embodiment, the amount of CMY ink discharged is assigned as much as possible to the amount of discharged RV ink, color separation of high luminance colors is done as much as possible to R ink, and color separation low luminance colors is done to V ink. Specifically, since the hue of R is between Y and M in Lab space, and the hue of V is between C and M, YM are first separated as much as possible to R, and CM are separated as much as possible to V.

At this time, in this embodiment, the amount of Y ink 1 and the amount of M ink 1 are assigned to the amount of R ink 1, and the amount of C ink 1 and the amount of M ink 1 are assigned as much as possible to V. For example, when the ratio between the amounts of CMYK ink is 50:30:20:10 after CMY has been separated into CMYK by a common procedure to represent a certain color, the ratio between the amounts of CMYKR ink is first determined as 50:10:0:10:20. The ratio between the amounts of CMYKR ink may furthermore be determined as 40:0:0:10:20.

Figure 6:
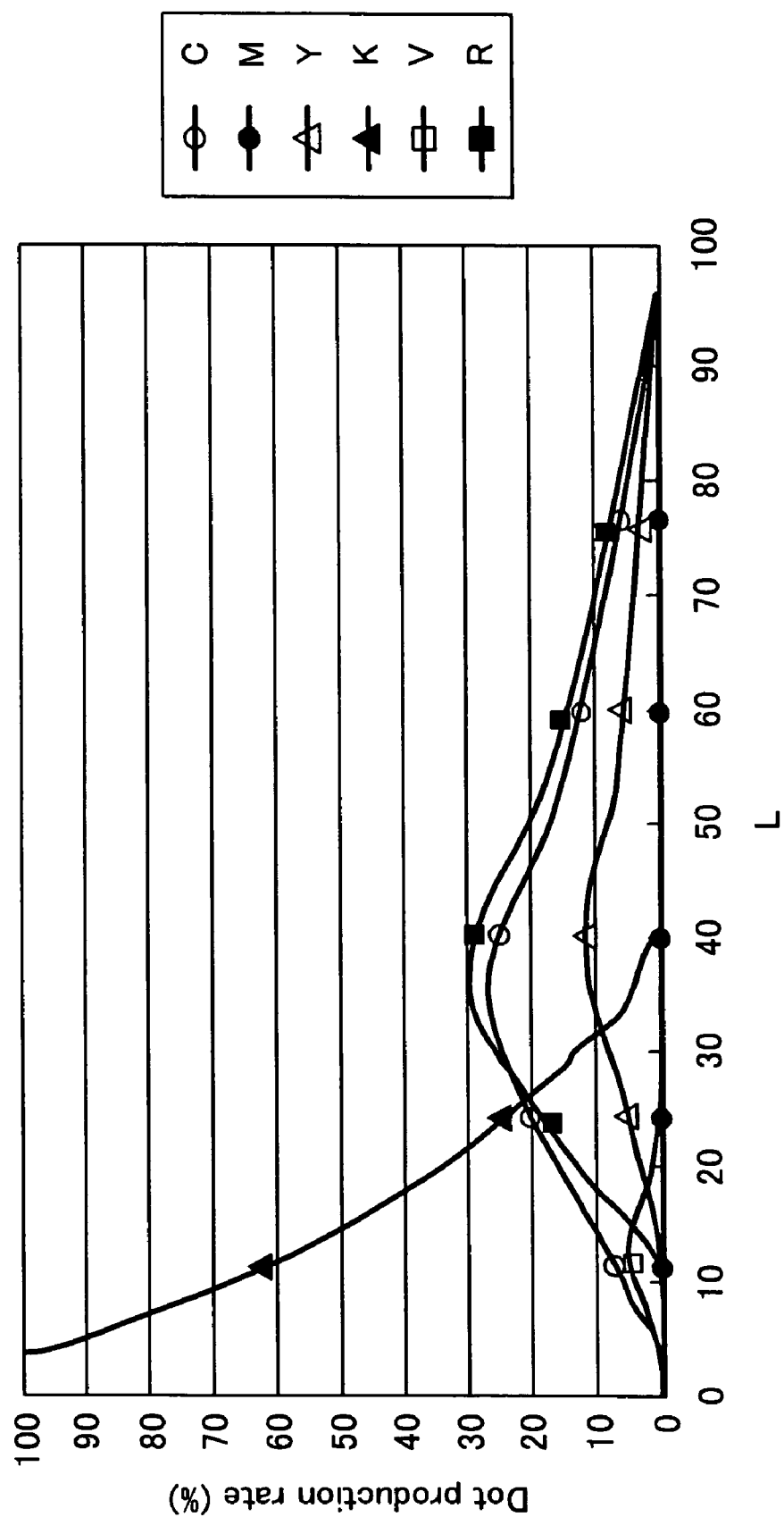
FIG. 6 illustrates an example of color ink dot production rates.

FIG. 6 illustrates color ink dot production rates for achromatic colors when a color separation process has been implemented as described above. The vertical axis is the Lab space luminance L. RV ink is used as much as possible in the color separation in this embodiment. Because M ink is used in the color separation of both RV inks, M ink is "0" for the achromatic colors shown in the figure. Of course, the above color separation procedure is an example. Color separation can be carried out in various ways, such as the establishment of a minimum so that the CMY inks will not fall below a certain level, the establishment of a maximum so that the RV inks will not surpass a certain level, and the use of more than one ratio between the amounts of YM ink and R ink and between the amounts of CM inks and V ink.

When the color separation process is implemented in Step S115 as described above, several patches are printed using the processed CMYKRV data in Step S120. The CMYKRV data is ascertained when the color patches are printed, and the color of the color patches is measured with a color-measuring device in Step S125, so as to match the CMYKRV data and the Lab space coordinates. As this gives the Lab coordinates of colors corresponding to the sRGB reference points and the Lab coordinates corresponding to the CMYKRV data, these Lab coordinates are used in Step S130 to determine the correlation between the sRGB data and CMYKRV data.

That is, the LUT 15b is prepared. Here, the coordinates in Lab space obtained in Step S120 above are not necessarily consistent with each other. The correlation between the two sets of data can be determined by interpolation, searching for optimal values, or the like. With interpolation, an accurate correlation can be determined by obtaining Lab coordinates for the several colors when the several color patches noted above are printed.

3) Printing Process

Figure 7:
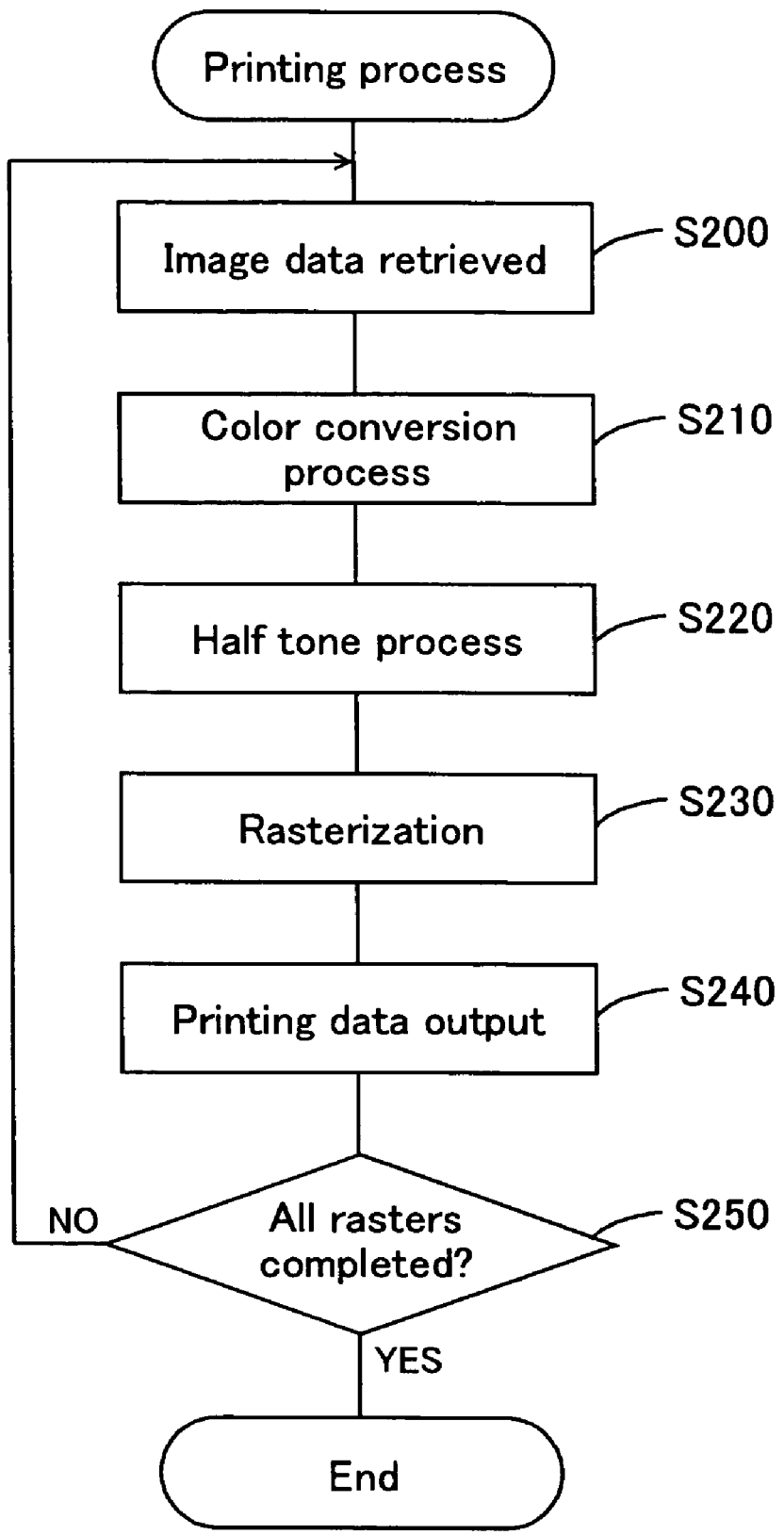
FIG. 7 is a flow chart of the printing process.

In this embodiment, the PRTDRV 21 prints to the printer 40 while performing color conversion using the LUT 15b. That is, the PRTDRV 21 comprises an image data retrieval module 21a, color conversion module 21b, half tone process module 21c, and printing data generation module 21d as shown in FIG. 3 for printing. The user enters a printing command by means of the APL 25 to implement the printing process according to the flow chart in FIG. 7. At the start of the printing process, the image data retrieval module 21a retrieves the image data 15a in RAM 14 in Step S200.

In Step S210, the image data retrieval module 21a activates the color conversion module 21b. The color conversion module 21b converts RGB gray scale levels to CMYKRV gray scale levels. In Step S210, the dot data of the image data 15a is converted to CMYKRV dot data. When the color conversion module 21b generates the CMYKRV gray scale data through color conversion, the half tone process module 21c is activated in Step S220, and the CMYKRV gray scale data is passed to the half tone process module 21c.

The half tone process module 21c converts the CMYKRV gray scale level of the dots to implement a half tone process for representing images by ink droplet printing density. In Step S220, head driver data for applying ink at the converted printing density is generated in Step S220. The printing data generation module 21d receives the head driver data, which is rearranged, in Step S230, into the sequence used by the printer 40. That is, an ejection nozzle array (not shown) is provided as an ink ejection device in the printer 40. Because a plurality of ejection nozzles are arranged in the sub-scanning direction in the nozzle array, data several dots apart in the sub-scanning direction can be used simultaneously.

Then, in the rasterization process, the data arranged in the main scanning direction which is to be simultaneously used is rearranged into a sequence so that it is simultaneously buffered in the printer 40. After the rasterization, printing data is produced with the addition of certain information such as image resolution, and is output through the parallel communications I/O 19b to the printer 40 in Step S230. The image displayed on the display 18 is printed by the printer 40 based on the printing data. The printer 40 applies the various colors of CMYKRV ink onto the printing medium based on the CMYKRV gray scale data as described above.

4) Printing Images

Figure 8:
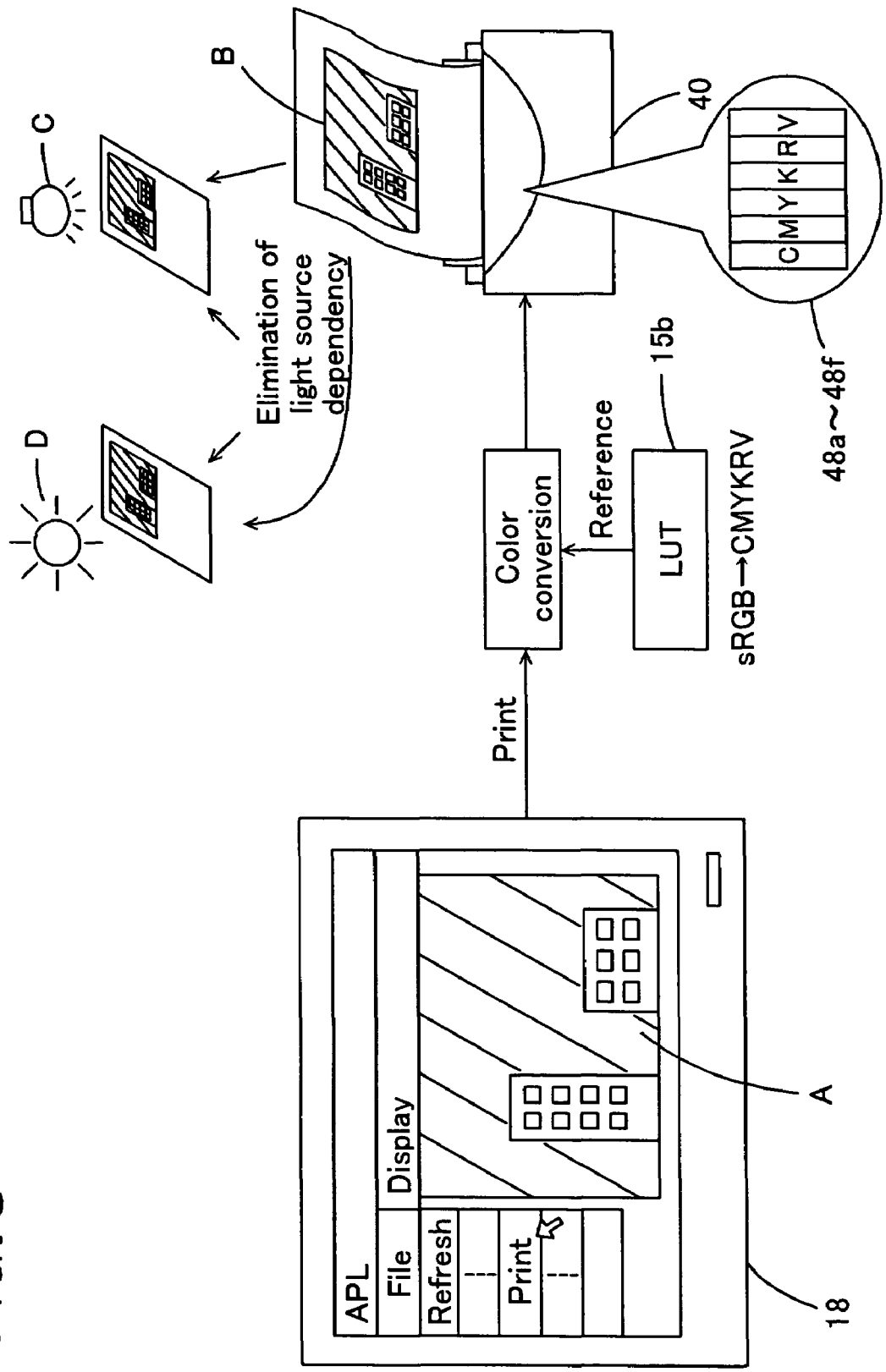
FIG. 8 is a schematic of operations during the printing of an image.

FIG. 8 is a schematic of operations during the printing of an image in the above structure. The display screen of the display 18 in FIG. 8 shows the APL 25 execution screen. When the image data 15a is read out by the APL 25, the image data 15a is stored in RAM 14, and an image A based on the image data 15a is displayed on the display 18 as a result of processing by the display DRV 23. As the effects of the present invention are particularly apparent with generally achromatic colors of low saturation, an image A with a dark background and an abundance of generally achromatic colors will be used as an example in the following description. The APL 25 is capable of retouching the image A on the display 18 in various ways, and is capable of issuing commands to print the image A. The execution screen in the figure is of print execute commands when the image data 15a stored on the HDD 15 has been read. The mouse 32 can be used to select the print tab in the file menu to give the print execute command.

Ideally, the generally achromatic colors in image A would have a generally constant spectral reflectance across all wavelengths of visible light, but at wavelength regions where changes in the tint of generally achromatic colors are apparent to the human eye and the spectral reflectance is not constant, changes in the energy of reflected light become more conspicuous and colors take on a certain tint when the energy at certain wavelengths becomes more intense as a result of changes in light source. However, the use of RV inks in addition to CMYK inks works against the effects of changes in light source because the spectral reflectance of the generally achromatic colors is more constant across all wavelengths of visible light compared to combinations of CMYK ink.

In the present invention, sRGB data is converted to CMYKRV data, and ink cartridges 48a through 48f filled with CMYKRV ink are installed in the printer 40, thus enabling printing with RV ink in addition to CMYK. Accordingly, the image B printed out by the printer 40 is characterized by fewer changes in color due to the light source, with no tinting of the generally achromatic colors, whether viewed under light source C (indoor lamp light) or light source D (sunlight).

As illustrated in FIG. 4, the above LUT 15b is a table of correspondences between sRGB data and CMYKRV data. In Step S210 above, any RGB gray scale level can be matched with a CMYKRV gray scale level through interpolation based on these reference points. Various conventional interpolation techniques can be used. Linear or spline interpolation can be used, for example. In another embodiment, the reference points in the LUT 15b can be expanded to a greater number of reference points by interpolation, the expanded reference points can be buffered to RAM 14, and the reference points in RAM 14 can be used for further interpolation. Of course, in addition to structures in which color conversion is managed with the use of color conversion tables, color conversion may also be done with profiles involving pre-defined conversion matrices.

5) Elimination of Light Source Dependency

Figure 9:
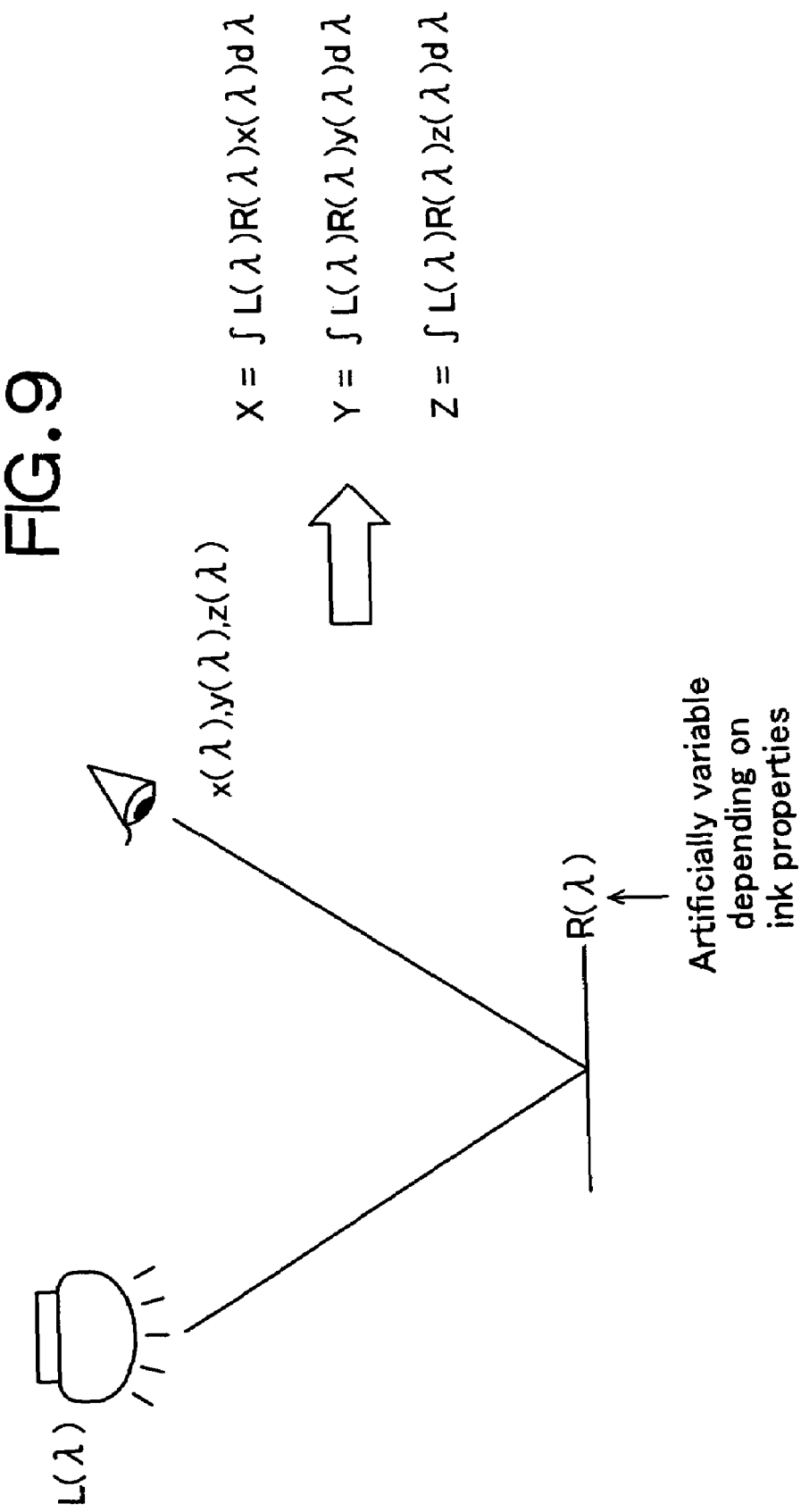
FIG. 9 illustrates the way colors appear to the human eye.

The following is a description of a scheme for eliminating the light source dependency of colors by means of the structure of the invention. The way colors appear to the human eye is discussed first. FIG. 9 illustrates the way colors appear to the human eye. Because the human eye perceives differences in colors based on the wavelength of light, the way colors look to the human eye can be determined by determining how much light of a given wavelength is contained in the light landing on the human eye, and by determining how the human eye reacts to light of a given wavelength.

The wavelength of light from printed materials which lands on the human eye is determined as the distribution of wavelengths contained in a light source, that is, the light source spectral distribution $L(\lambda)$, and the distribution of wavelengths contained in light reflected from the printed material, that is, the printed material spectral reflectance $R(\lambda)$. The way in which the human eye reacts to wavelengths of light is determined by color matching functions $x(\lambda)$, $y(\lambda)$, and $z(\lambda)$. Here, $x(\lambda)$ is the sensitivity of the red component, $y(\lambda)$ is the sensitivity of the green component, and $z(\lambda)$ is the sensitivity of the blue component. The color matching functions are usually represented with a horizontal line over the letter, such as an X bar, but the horizontal line has been left out for the sake of convenience in the present Specification. In ink jet printers such as the printer 40 in the present embodiment, the spectral reflectance $R(\lambda)$ is produced by the overlap (joined lines, using area coverage as a coefficient) of the spectral reflectance of the ink and the spectral reflectance of the printing paper where the printing paper is exposed. In these equations, $\lambda$ is the wavelength of the light.

The way colors look is calculated by multiplying the light source spectral distribution $L(\lambda)$ and the spectral reflectance $R(\lambda)$ and the color matching functions $x(\lambda)$, $y(\lambda)$, and $z(\lambda)$, and dividing by the wavelength to come up with tristimulus values XYZ. That is, the tristimulus values XYZ are calculated by the following Equation (1).

$$X = \int L(\lambda)R(\lambda)x(\lambda)d\lambda$$

$$Y = \int L(\lambda)R(\lambda)y(\lambda)d\lambda$$

$$Z = \int L(\lambda)R(\lambda)z(\lambda)d\lambda \quad (1)$$

The way colors look to the human eye is determined by the tristimulus values XYZ. That is, colors are absolutely determined by the combination of tristimulus values XYZ. Of the factors determining the tristimulus values XYZ, the aforementioned color matching functions $x(\lambda)$, $y(\lambda)$, and $z(\lambda)$ are mean values for properties of the human eye and are artificially invariable. The aforementioned spectral distribution $L(\lambda)$ is naturally variable as a result of changes in the light source. The present invention, which is intended to eliminate light source dependency, is a way to address changes in the spectral distribution $L(\lambda)$ of light sources. Among the factors determining the tristimulus values, most of the spectral reflectance $R(\lambda)$ is borne by the spectral reflectance of the ink, and can thus be artificially modified by varying the amount of ink and the number of ink colors. The present invention involves adding RV ink to CMYK ink in order to turn the spectral reflectance $R(\lambda)$ into a more desirable distribution.

Figure 10:
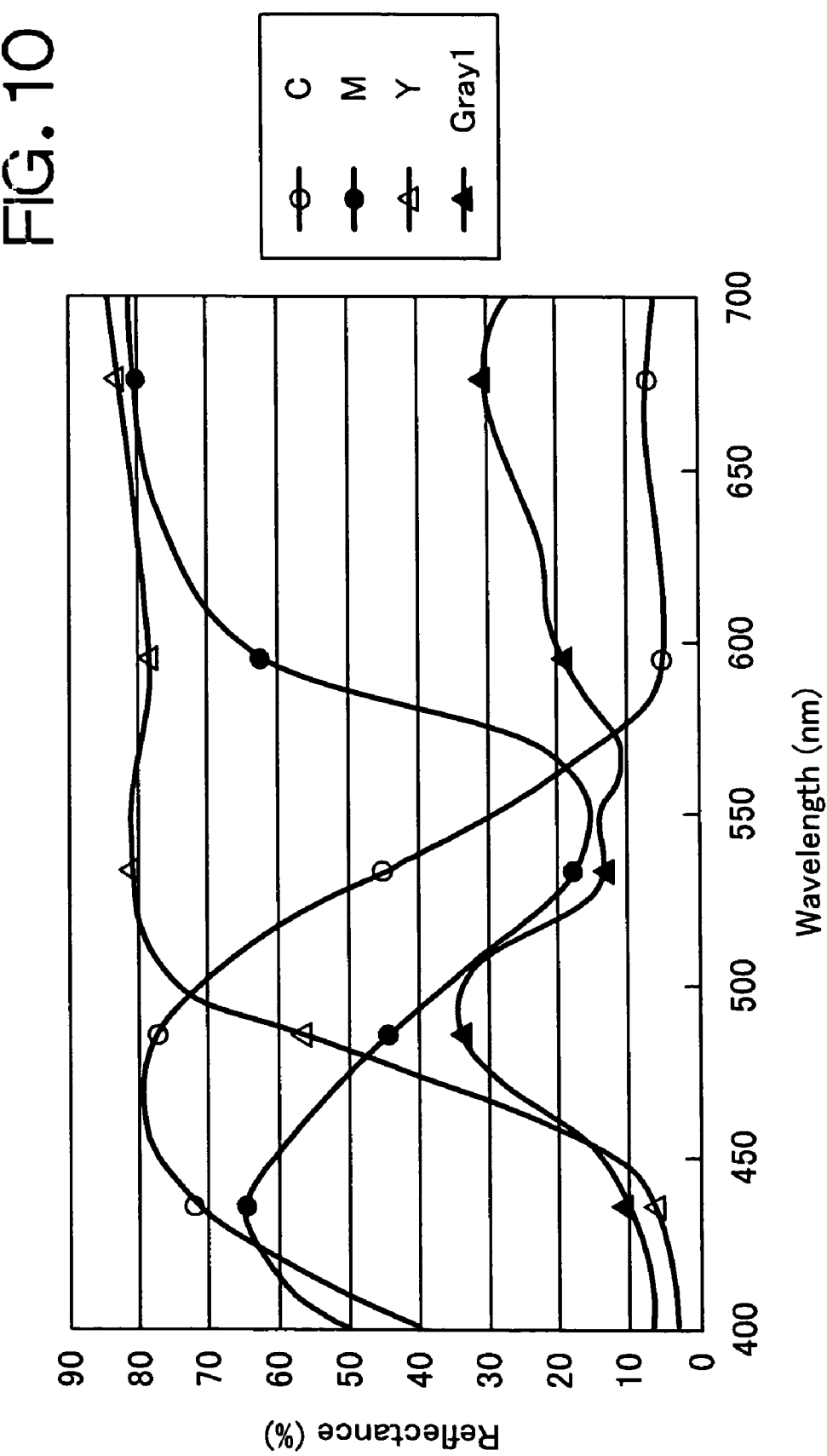
FIG. 10 illustrates the spectral reflectance for CMY inks.

A scheme for eliminating light source dependency through the addition of RV ink is described below. As the effects of the invention are most apparent with achromatic colors, achromatic colors are used in the following example. FIG. 10 illustrates the spectral reflectance of the CMY inks used in the invention. The vertical axis is the spectral reflectance (%), and the horizontal axis is the wavelength (nm). The spectral reflectance of CMY inks is the same as in conventional printers. As illustrated in the figure, the spectral reflectance of C increases from a wavelength of 400 nm with increases in wavelength, to about 80% between about 450 and 500 nm, and then decreases with increases in wavelength between about 500 nm and 600 nm, falling to no more than 10% between 600 nm and 700 nm.

The spectral reflectance of Y increases from a wavelength of 450 nm with increases in wavelength, to about 80% between about 500 and 700 nm. The spectral reflectance of M increases somewhat from a wavelength of 400 nm with increases in wavelength, then decreases with increases in wavelength between about 450 nm and 550 nm, then becomes elevated with increases in wavelength between 550 and 600 nm, to about 80% at a wavelength of 600 nm or more.

Gray 1 in FIG. 10 shows the overlapping spectral reflectance $R(\lambda)$ which results when all of the CMY inks are ejected onto printing paper (in this example, the CMY area coverages are 8%, 19%, and 13%, respectively, and the luminance is around 50). Ideally, the achromatic color spectral reflectance $R(\lambda)$ would be constant across all wavelengths, that is, the value for Gray 1 in FIG. 10 would be nearly parallel to the horizontal axis. However, the spectral reflectance $R(\lambda)$ is given by joining line segments resulting from the multiplication of the ink droplet area and exposed area of the printing paper (which are weighted) by the respective spectral reflectance values, making linear representation of the spectral reflectance $R(\lambda)$ for the combination of CMY inks unlikely. In FIG. 10, spectral reflectance peaks appear in particular at a wavelength of 500 nm. The spectral reflectance levels are extremely low at 400 nm. The spectral reflectance increases at a wavelength of 600 nm or higher. When the light source is changed, the color can become tinted due to the unevenness of the spectral reflectance values.

In contrast, the addition of RV ink as in the present invention reduces the unevenness of the spectral reflectance R (λ) of achromatic colors and makes it more linear. That is, the peaks of spectral reflectance resulting from CY ink are all greater than 50% around a wavelength of 500 nm. The decrease in spectral reflectance is the result of the intermediate spectral reflectance of CM around a wavelength of 400 nm and the extremely low spectral reflectance of Y, while the elevated spectral reflectance is caused by the YM spectral reflectance over 50% around a wavelength of 600 nm.

As such, the unevenness of the spectral reflectance R (λ) of the achromatic color can be reduced by adding ink having a low spectral reflectance (preferably no more than 20%) around a wavelength of 500 nm, an intermediate spectral reflectance around a wavelength of 400 nm, and a low spectral reflectance (preferably no more than 20%) around a wavelength of 600 nm. In this embodiment, R ink is used as ink meeting the conditions of a low spectral reflectance around a wavelength of 500 nm and an intermediate spectral reflectance at a wavelength of 400 nm among these three conditions, and V ink is used as ink meeting the above three conditions, including a low spectral reflectance around a wavelength of 600 nm.

Figure 11:
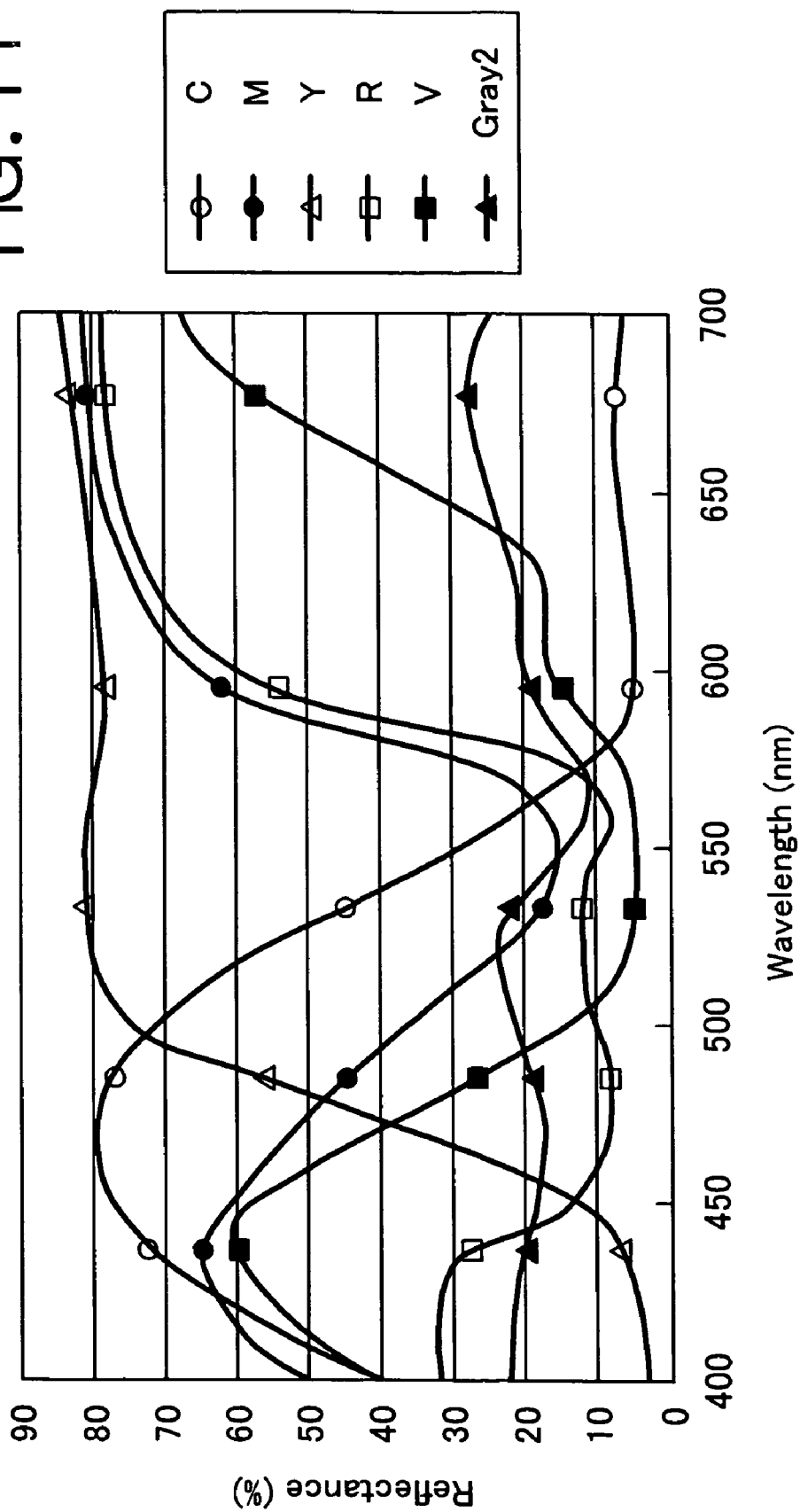
FIG. 11 illustrates the spectral reflectance for CMYRV inks.

In FIG. 11, the spectral reflectance levels of RV ink are superimposed on FIG. 10. The spectral reflectance of R is about 30% at a wavelength of 400 nm, decreases with increases in wavelength to about 10% around a wavelength of 550 nm, increases somewhat from a wavelength of 550 nm, and is elevated to about 80% around a wavelength of 620 nm. The spectral reflectance of V increases somewhat from a wavelength of 400 nm with increases in wavelength, decreases with increases in wavelength at wavelengths of 450 to 500 nm, remains virtually constant at wavelengths of 500 nm to 620 nm, and then becomes elevated starting at a wavelength of 620 nm with increases in wavelength. The elevation is lower compared to either C or M.

That is, both R and V inks have a low spectral reflectance (no more than 20%) around a wavelength of 500 nm and an intermediate spectral reflectance (30 to 40%) around a wavelength of 400 nm. Accordingly, RV ink helps to increase the spectral reflectance resulting from combinations of CMY at a wavelength of 400 nm and reduce the spectral reflectance at a wavelength of 500 nm. V ink helps to control increases in the spectral reflectance at a wavelength of 600 nm or higher resulting from combinations of CMY ink. As shown by Gray 2 in FIG. 11, therefore, the spectral reflectance R (λ) of achromatic colors resulting from a combination of CMYKRV is flatter across all wavelengths compared to Gray 1. At CYR area coverages of 9%, 5%, and 11%, respectively, for a given color, the spectral reflectance of Gray 2 in FIG. 11 can be realized at a luminance of about 50, similarly to Gray 1 in FIG. 10. However, combining the CMYRV inks generally makes it easier, with considerable latitude, to adjust the profile of the overlapping spectral reflectance levels.

Figure 12:
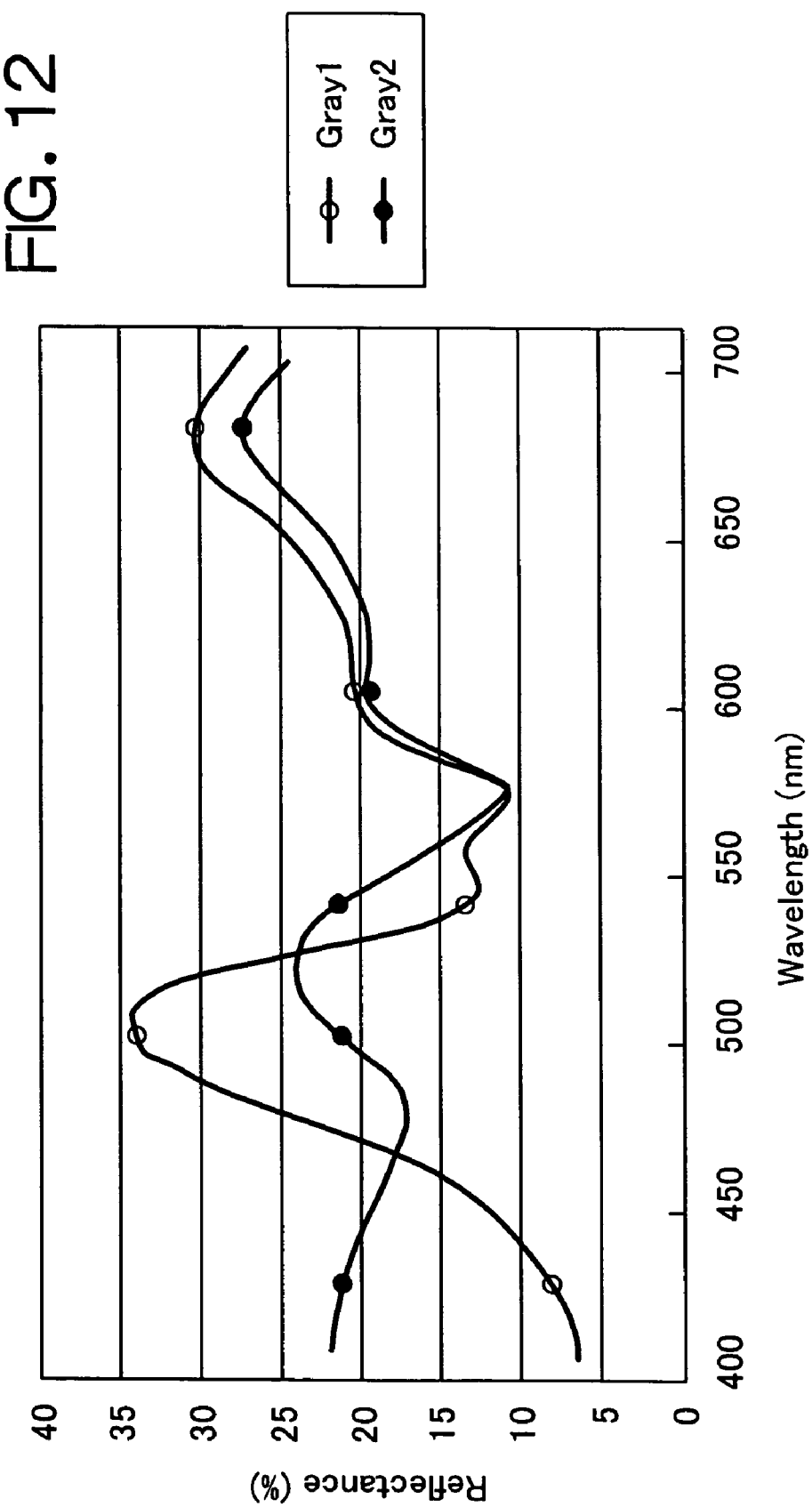
FIG. 12 shows a comparison of the spectral reflectance R ($\lambda$) of achromatic colors.

In FIG. 12, the spectral reflectance R (λ) of Gray 1 obtained with a combination of CMY inks and the spectral reflectance R (λ) of Gray 2 obtained with a combination of CMYRV inks are reproduced on the same graph. As is evident in the figure, the spectral reflectance R (λ) of Gray 1 is far lower at 400 nm than other wavelengths, has a large peak at 500 nm, and is elevated at 600 nm or more, but the spectral reflectance R (λ) of Gray 2 is flatter across all wavelengths, with no particularly high or low peaks in spectral reflectance. FIGS. 10 through 12 assume the creation of achromatic color of a given luminance through the combination of CMY inks and RV inks. The spectral reflectance R (λ) of achromatic colors will vary as a result of changes in the amounts of CMY inks or RV inks at other luminance levels, but the addition of RV ink to CMY ink will enable flexible control of the spectral reflectance R (λ) to achieve a more ideal spectral reflectance.

Figure 13:
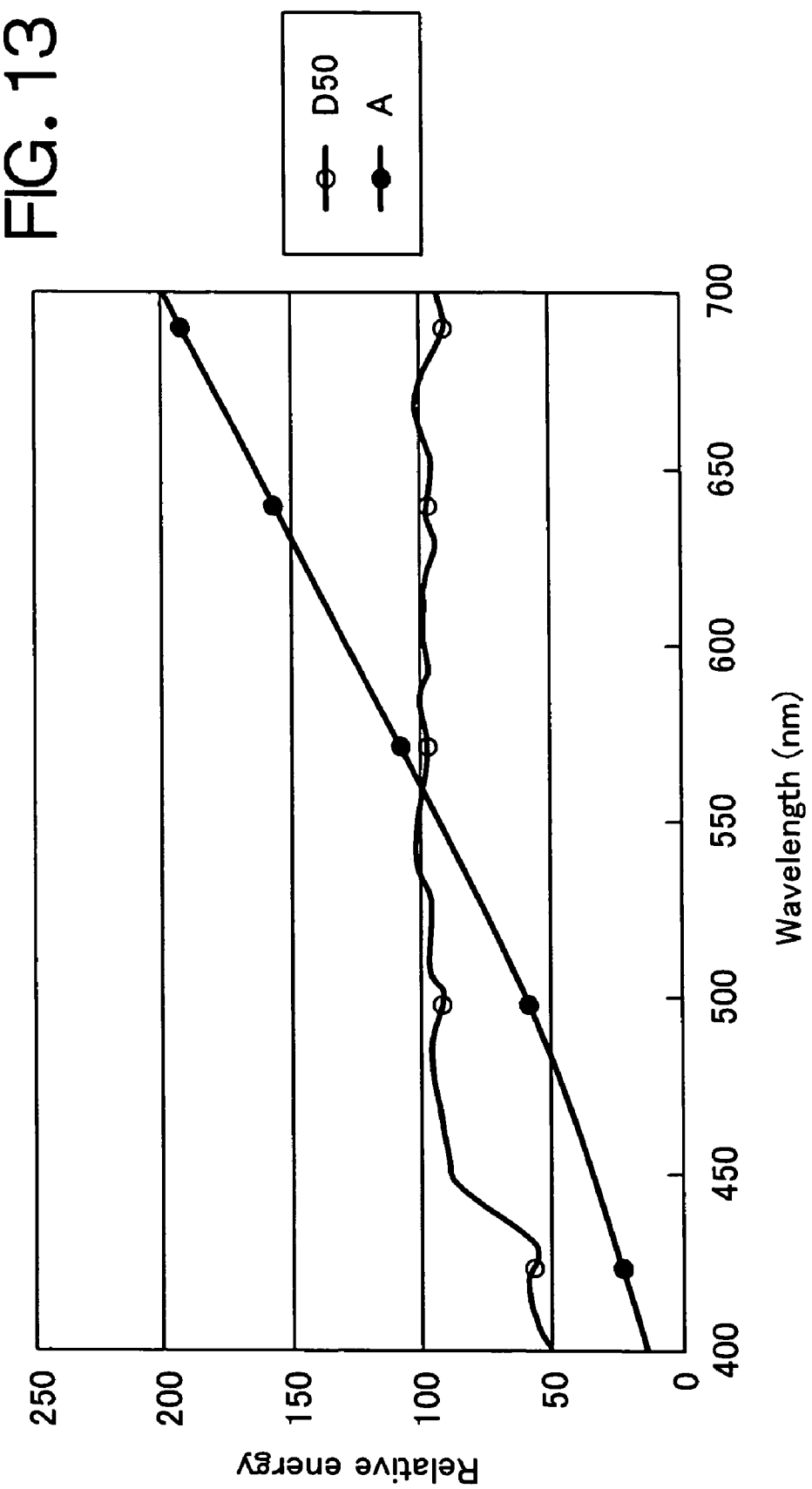
FIG. 13 illustrates the spectral distributions of a D50 light source and an A light source.

The following is a description of a scheme for eliminating light source dependency, that is, for avoiding changes in achromatic colors despite changes in light source, when the spectral reflectance R (λ) is flat across all wavelengths as described above. FIG. 13 gives the spectral distributions of light sources D50 and A, as stipulated by CIE (Commission Internationale de l'Eclairage). The vertical axis relatively represents the energy of the light, and the horizontal axis is the light wavelength. The figure shows that light source D50 has a virtually constant spectral distribution across all wavelengths of visible light, which is referred to as white light. The energy of light source A increases in virtually linear fashion with increases in wavelength. This is reddish light.

As noted above, to the human eye, colors appear as colors represented by the tristimulus values X, Y, and Z, and the aforementioned achromatic color spectral reflectance R (λ) and the light source spectral distribution play a role in multiplied form in the tristimulus values X, Y, and Z. When the above light source D50 is multiplied relative to the above Gray 1 and 2, the role played is virtually constant across all wavelengths. Both thus appear to be achromatic colors. However, because the energy is greater the greater the wavelength in light source A, the role played is greater at greater wavelengths and lower at lower wavelengths.

When the spectral distribution of light source A is multiplied by Gray 1 and 2, the role played is the same for both, but since Gray 1 is characterized by greater variation in spectral reflectance R (λ) and has a less constant spectral reflectance than Gray 2, the result is less achromatic when the spectral distribution of light source A is multiplied by Gray 1. In the example illustrated in FIG. 12, for instance, Gray 1 has a low spectral reflectance at a wavelength of 450 nm or less, where as Gray 2 has a greater spectral reflectance. Thus, when the spectral distribution is multiplied, virtually no role is played at a wavelength of 450 nm or less in combinations of CMY ink (Gray 1), and it does not appear achromatic.

Figure 14:
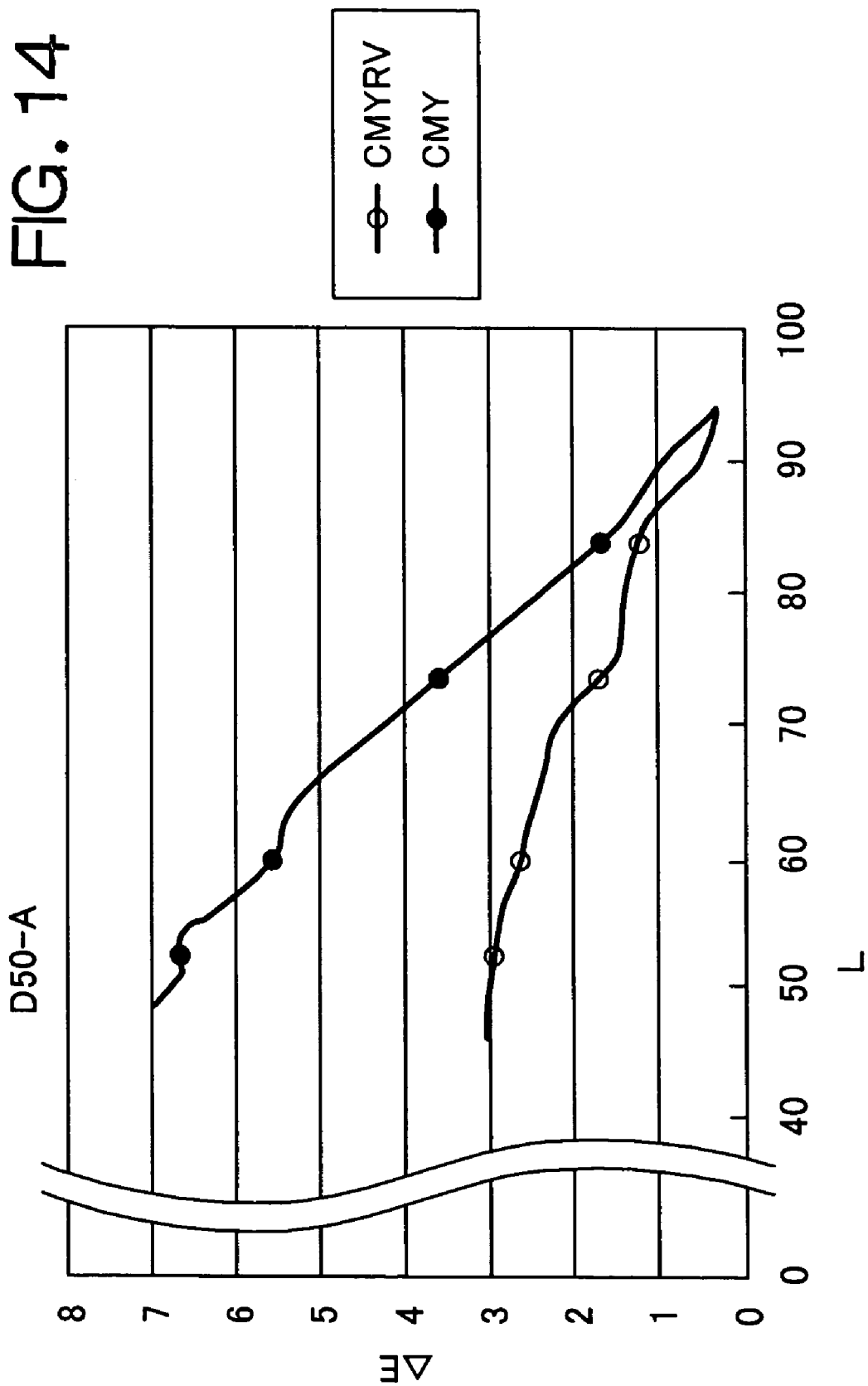
FIG. 14 illustrates the color difference when light sources are changed.

FIG. 14 shows differences in chromatic value under light sources D50 and A for various achromatic colors obtained by combinations of CMY inks and combinations of CMYRV inks. As noted above, colors are represented by tristimulus values X, Y, and Z. In the figure, the tristimulus values X, Y, and Z are converted to chromatic values in Lab space (absolute color space), the color difference ΔE according to light source (distance in Lab space) being represented on the vertical axis. The horizontal axis is the luminance L. In this embodiment, when the luminance L is 40 or less, black ink (K) is used, and colors with a luminance of 45 or more, which contain no black, are thus compared. As shown in the figure, there were more color differences ΔE caused by changes in light source with combinations of CMY ink than with combinations of CMYRV ink. Combinations of CMYRV ink thus resulted in far fewer changes in color as a result of changes in light source. That is, the light source dependency was eliminated.

As noted above, the invention features the use of RV having a low spectral reflectance at wavelength regions where CMY have a high spectral reflectance, but hues having a low spectral reflectance at wavelength regions where CMY have a high spectral reflectance are not limited to R and V. RV inks also have low spectral reflectance values at wavelength regions different from the wavelength regions where CMY inks have low spectral reflectance values. That is, C ink has a low spectral reflectance at a wavelength of 550 nm or more, but R ink has a low spectral reflectance around a wavelength that is 450 to 550 nm different from that of the C ink, and V ink has a low spectral reflectance around a wavelength that is 500 to 550 nm different from that of the C ink.

M ink has a low spectral reflectance around a wavelength of 520 to 580 nm, but R ink has a low spectral reflectance around a wavelength that is 450 to 520 nm different from that of the M ink, and V ink has a low spectral reflectance around a wavelength that is 580 to 620 nm different from that of the M ink. Y ink has a low spectral reflectance around a wavelength of 470 nm or less, but R ink has a low spectral reflectance around a wavelength that is 470 to 550 nm different from that of the Y ink, and V ink has a low spectral reflectance around a wavelength that is 500 to 620 nm different from that of the Y ink.

It is thus possible to reduce differences in the way colors look as a result of differences in light source by using RV inks which have a low spectral reflectance at wavelength regions different from the wavelength regions where CMY inks have low spectral reflectance values. This is not limited to R and V inks. It is also possible to use chromatic colored inks of other hues, provided that they have low spectral reflectance values at wavelength regions different from the wavelength regions where CMY inks have low spectral reflectance values. For example, orange or blue-violet inks can be used. R, V, orange, blue-violet, and the like can be added individually. Other possible structures which can be used include the addition of other inks to combinations based on three colors other than those based on CMY inks.

6) Other Embodiments

Figure 15:
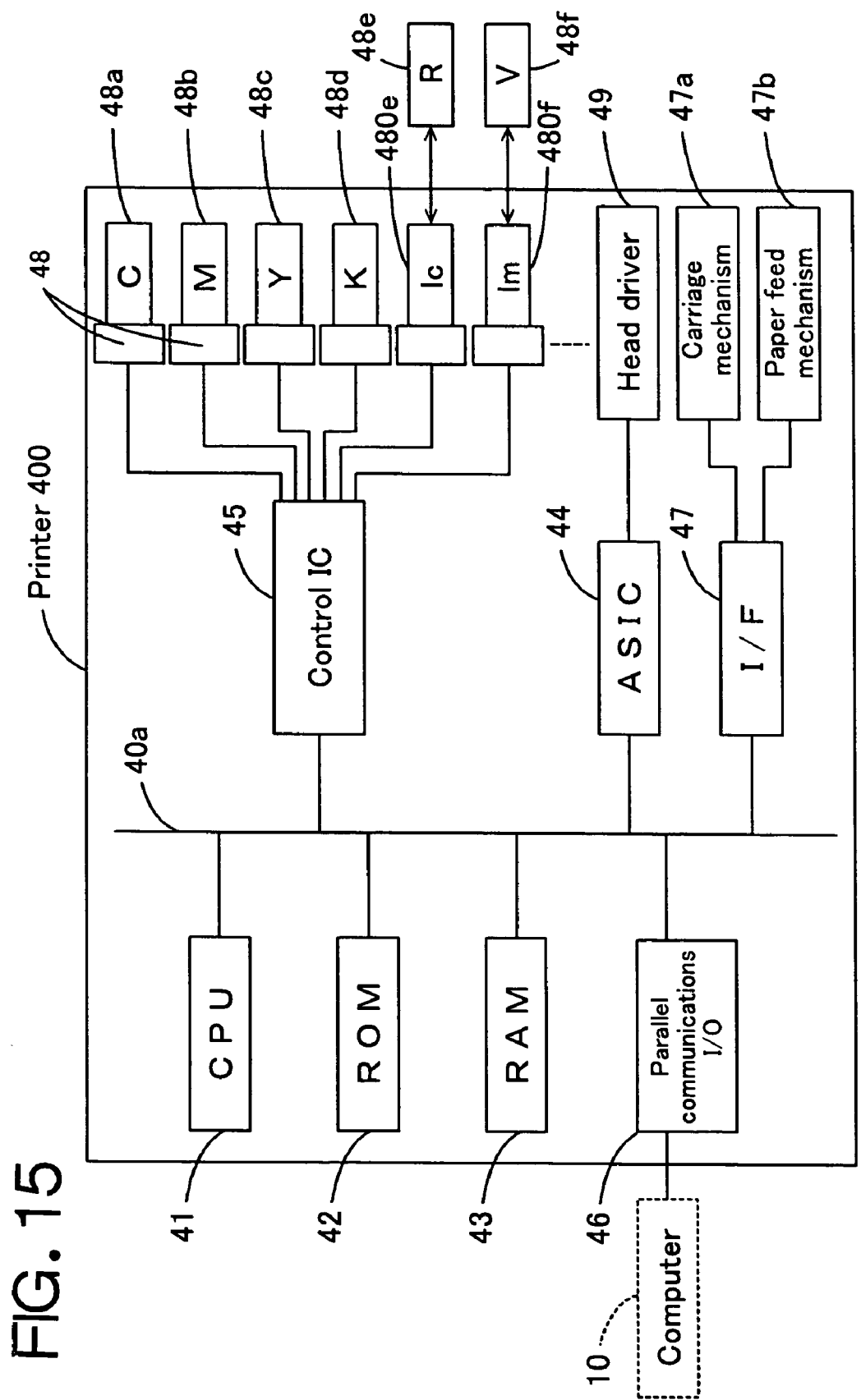
FIG. 15 schematically illustrates the hardware structure of a printer.

In the above embodiments, a default second ink cartridge filled with RV ink was installed in the printer 40, but the use of the RV ink can also be arranged to be selected as needed by the user. FIG. 15 is a schematic illustration of the hardware structure of a printer 400 in which the use of RV ink is selected as needed by the user. The parts of this printer which are the same as the above printer 40 are indicated by the same symbols as in FIG. 2 above. A software structure similar to that of PRTDRV 21 in FIG. 3 above may be used, but in this embodiment, an LUT 15c (not shown) in which the correlation between the CMYKlclm data and sRGB data is determined has been pre-stored in addition to the above LUT 15b on the HDD 15, and can be selected by the user on the printing properties screen.

Specifically, as illustrated in FIG. 15, default ink cartridges 48a through 48d, and 480e and 480f, filled with CMYKlclm inks, are installed in the printer 400. The ink cartridges 48a through 48d, 480e, and 480f are mounted on the cartridge holder 48 of the printer 400, and the lc ink cartridge 480e and the lm ink cartridge 480f are exchangeable with an R ink cartridge 48e and V ink cartridge 48f.

Figure 16:
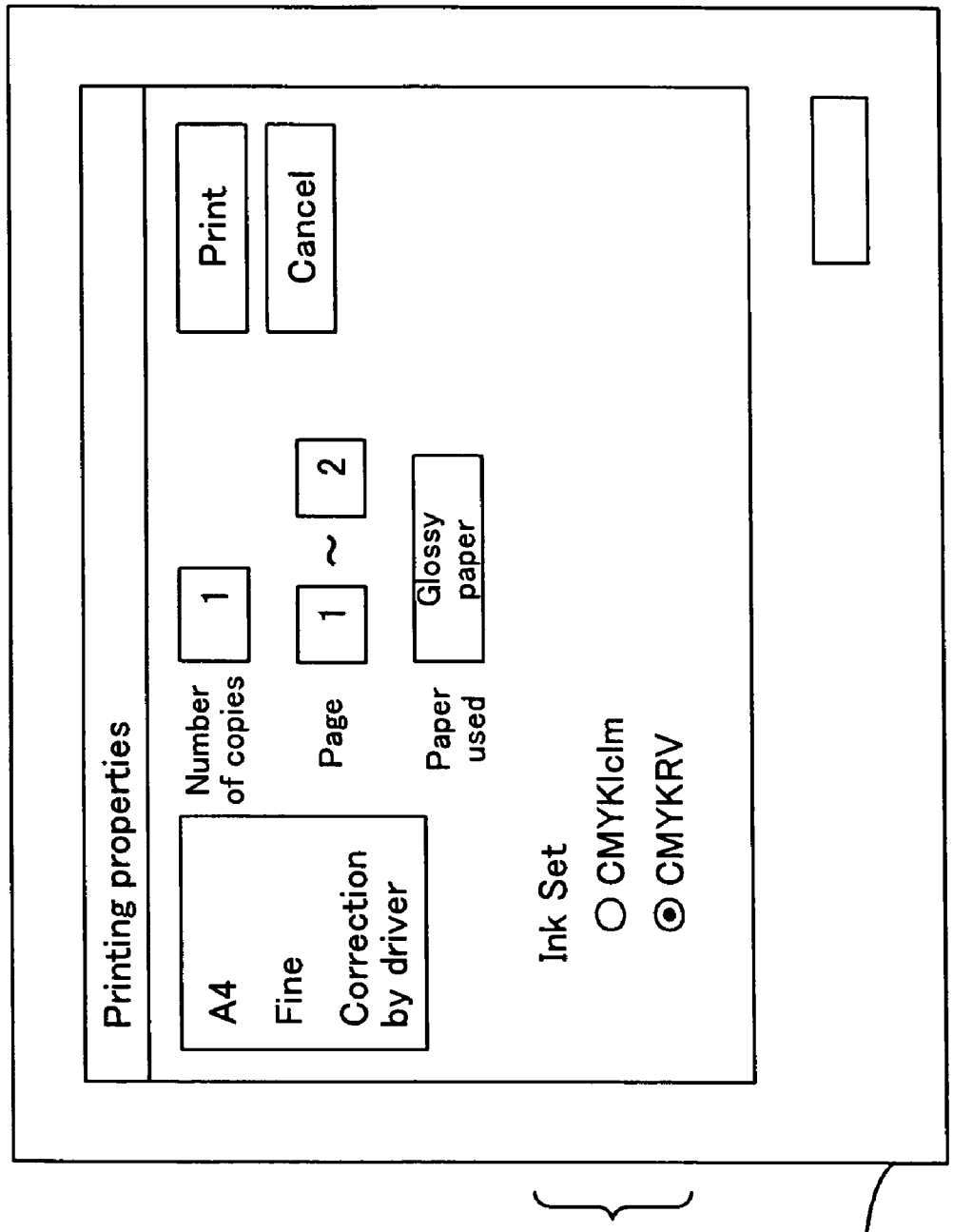
FIG. 16 illustrates a printer properties screen.

FIG. 16 shows the printing properties screen which is displayed when the printing command is given by the APL 25. That is, when a print command is given by the APL 25, the PRT DRV 21 is activated, and the PRT DRV 21 sends data to the display DRV 23 to display a UI for inputting the data necessary for printing. The UI is a screen with the printing properties. The PRT DRV 21 receives various types of operating input, via the input device DRV 22, from the user who uses a keyboard 31 or the like while looking at the screen.

Various parameters which should be designated during printing can be input on the printing properties screen shown in the figure, which can include various types of input boxes for inputting the number of copies or the number of pages, and various types of buttons for giving print commands or cancel commands, etc. An ink set selection radio button 18a is also provided at the bottom of the properties screen, allowing the user to change the display contents of the ink set selection radio button 18a by means of a pointer or the like using the mouse 32. The ink set (ink colors) that are used are matched to the ink set selection radio button 18a, allowing the user to set the inks used to CMYKlclm inks or CMYKRV inks.

The details selected by the ink set selection radio button 18a are sent to the color conversion module 21b, and the color conversion module 21b selects an LUT suited to the selected details. That is, when CMYKRV are selected by the ink set selection radio button 18a, the aforementioned LUT 15b is selected, and the aforementioned LUT 15c (not shown) is selected when CMYKlclm are selected by the ink set selection radio button 18a. As a result, the user can print by suitably selecting either CMYKlclm inks or CMYKRV inks.

Printers which use CMYKlclm inks by default, such as in this embodiment, are extremely common. The present invention can be implemented merely by adding an LUT to this common structure and making slight modifications of the software. In this embodiment, the color conversion module 21b does not necessarily have to obtain setting details by the printing properties screen. For example, the data in cartridge memory in the ink cartridges can be read and the ink in ink cartridge 48e can be determined to automatically select the LUT.

When the lclm ink and RV ink supply paths are the same, as in this embodiment, the paths should be carefully cleaned by an ink supply path cleaning mechanism (not shown) in the printer 400 during ink color conversion. The ink colors do not have to be changed in order to be able to use both CMYKlclm inks and CMYKRV inks. The number of cartridge holders may be increased to set up ink cartridges filled with CMYKclmRV inks.

7) Other Embodiments

In the above embodiments, the printing control device was composed of a computer 10, but the printing control process of the invention can be run by a program running environment installed in the printer 40, and image data can be obtained from a digital camera directly connected to the printer 40 to perform the printing control process. The printing control process may also be performed by the digital camera in a similar structure. Other structures that can be used include implementing the printing control process of the invention by means of decentralized processing, etc. The printing control process of the invention can also be implemented by what are referred to as compound machines which combine scanners for retrieving images and printers for printing images.

The above image data 15a was data in dot matrix form, where RGB (red, green, blue) color components are represented in gray scales to determine each pixel color, but the invention is not limited to this configuration, provided that the image data can show the image of the printing subject. Various types of data can be used, such as JPEG image data using the YCbCr color coordinate system or image data using the CMYK color coordinate system. The invention can, of course, also employ data based on the Exif 2.2 standard (registered trademark by the Japan Electronics and Information Technology Industries Association) or data based on Print Image Matching (PIM; PIM is a registered trademark of Seiko-Epson).

Furthermore, the above descriptions were of structures for reducing differences primarily in the way achromatic colors look as a result of differences in light source, but the action and effect of the invention are not limited to achromatic colors. That is, when certain chromatic colors are observed under two or more different light sources, there are changes in the product of the light source spectral energy and the overlapping spectral reflectance values. Differences can thus be produced to an extent where colors will change when the light source changes, depending on the shape of the overlapping spectral reflectance values. The representation of a given chromatic color through a combination of CMYKRV makes it possible to use colors that are less susceptible to the effects of light source, allowing printing to be done with minimal differences in color.

As an example, a combination of CMYKRV can be selected so as to minimize changes in color due to changes in light source, and the CMYKRV data showing the colors can be registered in an LUT. More specifically, this can be realized by modifying the preparation of the LUT in the first embodiment above. That is, the hardware structure illustrated in FIGS. 1, 2, and 3 and the software structure in FIG. 3 can be the same as in the first embodiment above, and the operations for minimizing differences in color can be done during the preparation of the LUT 15b registered in HDD 15.

The operations in Steps S115 through S130 are different than in the first embodiment for minimizing differences in color. That is, in Step S115, the CMY are separated into CMYKRV. Not only can YM be separated as much as possible into R and CM be separated as much as possible into V at that time, as noted above, but colors can be separated according other standards as well to prepare as many combinations of CMYKRV as possible.

Figure 17:
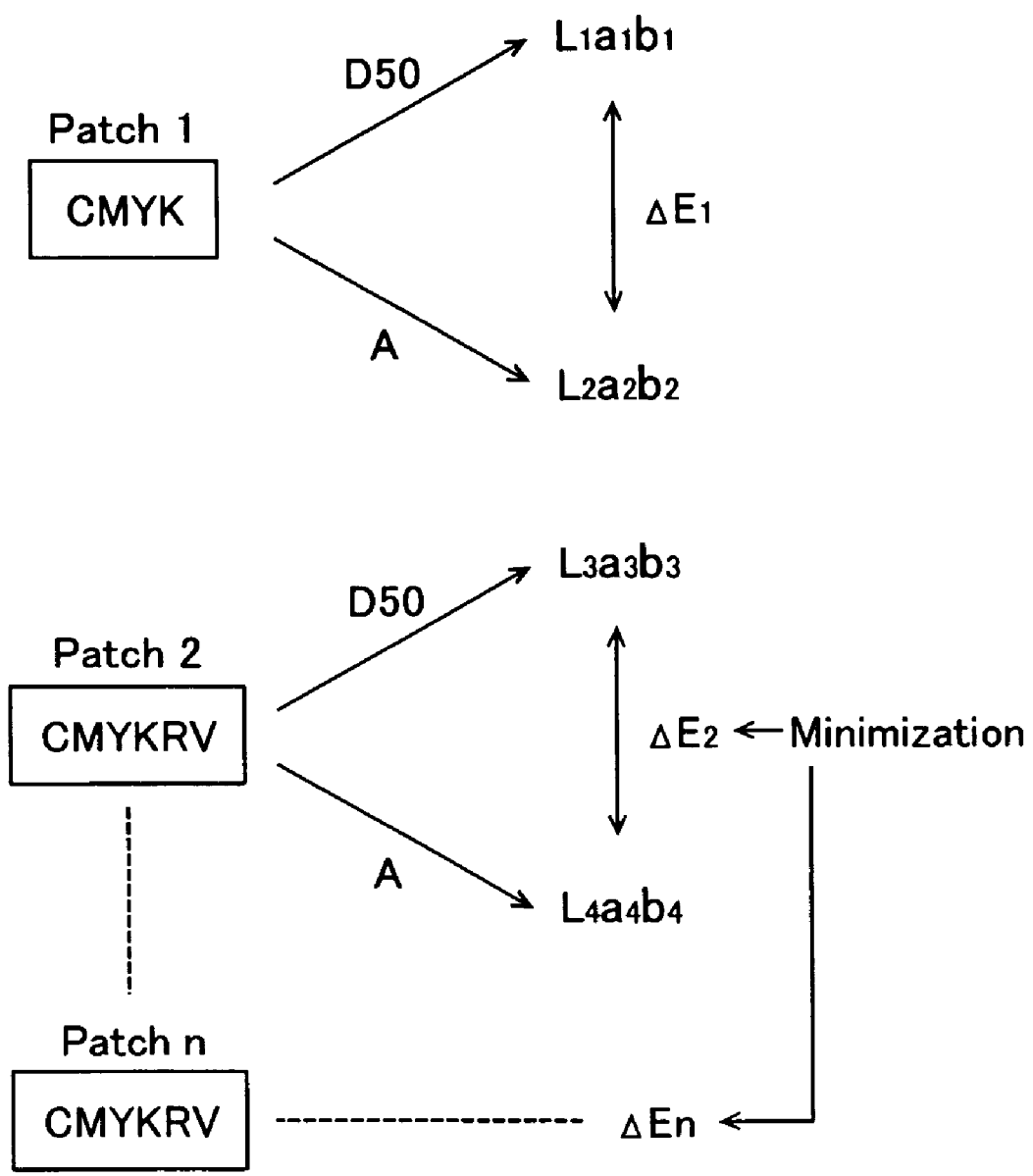
FIG. 17 illustrates the minimization of color difference.

In this way, a large number of CMYKRV data is produced to print patches, and a large number of patches can be printed. In Step S125, the colors of the large number of patches are measured under at least two light sources to determine the correspondence between CMYKRV and Lab. FIG. 17 illustrates the measurement of patch colors under two light sources.

In the figure, patch 1 is printed with CMYK inks, patches 2 though patch n are printed with colors close to patch 1 by means of CMYKRV inks, and the colors are measured under light sources D50 and A. The results of the measurement of patch 1 under light source D50 in the figure are L1a1b1, and the results for measurement under light source A are L2a2b2. The results of the measurement of patch 2 under light source D50 are L3a3b3, and the results for measurement under light source A are L4a4ab4.

Differences will be revealed in the results of the measured colors under the two light sources. In FIG. 17, the differences in color are ΔE1 for patch 1, ΔE2 for patch 2, and ΔEn for patches n. Although changes in light source will naturally lead to differences in the results of the measured colors, the addition of RV inks to the CMYK inks will allow similar colors to be represented by the large number of combinations and will allow the lowest possible color difference to be selected from among color differences ΔE2 through ΔEn.

That is, comparison of CMYK and CMYKRV will show CMYKRV to have more arbitrary combinations, enabling the selection of patches with less color difference than CMYK, the selection of minimal color differences from the large number of CMYKRV data, and the selection of patches with minimal color differences. The selection in this manner of those with minimized color differences allows the colors exhibited by the patches to be converted to the CMYKRV data of the patches by means of the color conversion described above. The correlation to Lab can be determined by extracting colors with minimal color differences through the same process as in FIG. 17 on a plurality of colors disposed generally evenly within color regions formed by CMYKRV color components in Step S125.

In Step S130, the corresponding sRGB data can be calculated based on the Lab of colors with minimized color differences, and can be matched with the CMYKRV data of colors with minimized color differences. It is thus possible to prepare an LUT which will enable printing with colors having minimal color differences. Thus, when color conversion is undertaken with reference to the LUT, and the CMYKRV data produced by color version is used for printing, the resulting printed material will be characterized by fewer differences in color when observed under light sources D50 and A. Of course, the light sources are not limited to D50 and A. Other light sources can also be used, and differences in color can be minimized under three or more light sources. In this embodiment, a large number of patches were printed to measure colors in order to minimize color differences, but a variety of other structures can be employed, provided that CMYKRV data with minimized color differences is extracted and registered in LUT.

The aforementioned minimization does not necessarily mean that it must be done strictly mathematically. That is, color differences may be minimized by selecting colors with the least difference upon comparison of color differences between finite colors. When comparing color differences among finite colors, any colors with a color difference under a certain level may be used. To employ such a structure, it is assumed that there will be a plurality of ink combinations for outputting certain colors and generally similar colors, and the differences between these colors under a certain standard light source and under other light sources should be ascertained. The ones with the least color differences should be selected from them, and ink color image data showing the combination of inks should be used as the colors showing the above certain colors for printing with colors having the least differences among the aforementioned ink combinations.

Although the present invention has been described and illustrated in detail, it is clearly understood that the same is by way of illustration and example only and is not to be taken by way of limitation, the spirit and scope of the present invention being limited only by the terms of the appended claims.

The disclosure of Japanese Patent Application No. 2003-162671 filed Jun. 6th, 2003 including specification, drawings and claims is incorporated herein by reference in its entirety.

What is claimed is:

1. A printing device, comprising:
an ink cartridge installation component, in which is installed a first ink cartridge for inks having at least three chromatic colors, filled with chromatic colored ink, and in which is installed a second ink cartridge filled with chromatic colored ink that has a lower spectral reflectance when printed at a certain area coverage on a certain printing medium at each wavelength region in which the spectral reflectance of the inks having the at least three chromatic colors is greater when they are printed at a certain area coverage on the certain printing medium, the wavelength region resulting in a greater spectral reflectance when the inks are printed at a certain area coverage on a certain printing medium being a wavelength region where the spectral reflectance is greater than a first certain threshold, and the wavelength region resulting in a lower spectral reflectance when the inks are printed at a certain area coverage on the certain printing medium being a wavelength region where the spectral reflectance is lower than a second certain threshold; and a printing unit that ejects on to printing paper the ink received from the first and second ink cartridges.

2. A printing device according to claim 1, characterized in that the wavelength region resulting in a greater spectral reflectance when the inks are printed at a certain area coverage on a certain printing medium overlaps with at least a portion of the wavelength region resulting in a lower spectral reflectance when the ink of the second ink cartridge is printed at a certain area coverage on the certain printing medium.

3. A printing device according to claim 1, characterized in that, when the ink in the second ink cartridge is printed at a certain area coverage on a certain printing medium, the spectral reflectance is lower than when the inks having the at least three chromatic colors are printed at a certain area coverage on the certain printing medium at a wavelength region where the spectral reflectance is greater at a certain wavelength when a combination of the at least three chromatic colors is printed at a certain area coverage on a certain printing medium than the spectral reflectance at another wavelength.

4. A printing device according to claim 1, characterized in that the printing device further comprises: a component for obtaining image data comprising a plurality of pixels; a color conversion table memory component for storing color conversion tables determining a relationship between the image data and ink color image data determining a color of the pixels based on a color of the ink in the second ink cartridge and the at least three chromatic colors; a color conversion component for converting the image data to the ink color image data by referencing the color conversion tables; a printing data generating component for generating printing data to permit printing with colors determined by the ink color image data following the color conversion; and a printing unit control component for controlling the printing unit based on the printing data.

5. A printing device according to claim 4, characterized in that the color conversion tables are prepared by a color separation process in which the at least three chromatic colors are replaced by the color of the ink in the second ink cartridge.

6. A printing device according to claim 5, characterized in that magenta and yellow inks are replaced by red ink in the color separation process.

7. A printing device according to claim 5, characterized in that magenta and cyan inks are replaced by violet ink in the color separation process.

8. A printing method, comprising the steps of:

supplying ink from an ink cartridge installation component, in which is installed a first ink cartridge for inks having at least three chromatic colors, filled with chromatic colored ink, and in which is installed a second ink cartridge filled with chromatic colored ink that has a lower spectral reflectance when printed at a certain area coverage on a certain printing medium at each wavelength region in which the spectral reflectance of the inks having the at least three chromatic colors is greater when they are printed at a certain area coverage on the certain printing medium, the wavelength region resulting in a greater spectral reflectance when the inks are printed at a certain area coverage on a certain printing medium being a wavelength region where the spectral reflectance is greater than a first certain threshold, and the wavelength region resulting in a lower spectral reflectance when the inks are printed at a certain area coverage on the certain printing medium being a wavelength region where the spectral reflectance is lower than a second certain threshold; and printing the supplied ink onto printing paper by using the ink of the second ink cartridge along with the at least three chromatic colors.

* * * * *